(12) United States Patent
Kaploun

(10) Patent No.: US 7,154,190 B2
(45) Date of Patent: Dec. 26, 2006

(54) ALL-WEATHER ENERGY AND WATER PRODUCTION VIA STEAM-ENHANCED VORTEX TOWER

(76) Inventor: Solomon Kaploun, 5 / 1 Strouma Street, Haifa (IL)

( * ) Notice: Subject to any disclaimer, the term of this patent is extended or adjusted under 35 U.S.C. 154(b) by 0 days.

(21) Appl. No.: 10/310,888

(22) Filed: Dec. 6, 2002

(65) Prior Publication Data

US 2003/0201644 A1 Oct. 30, 2003

Related U.S. Application Data

(63) Continuation-in-part of application No. 10/133,488, filed on Apr. 29, 2002.

(51) Int. Cl.
*F03B 13/00* (2006.01)
*F03B 13/10* (2006.01)
*H02P 9/04* (2006.01)
*F03D 9/00* (2006.01)

(52) U.S. Cl. .................. 290/43; 290/54; 290/55
(58) Field of Classification Search ............ 290/55, 290/44, 43, 54; 60/641.11, 641.12, 398, 60/676; 415/2, 4.2, 7, 3, 907
See application file for complete search history.

(56) References Cited

U.S. PATENT DOCUMENTS

| | | | | |
|---|---|---|---|---|
| 3,935,897 A | * | 2/1976 | Pulver | 165/49 |
| 4,064,409 A | | 12/1977 | Rendman | 310/306 |
| 4,070,131 A | | 1/1978 | Yen | 415/4 |
| 4,095,118 A | * | 6/1978 | Rathbun | 290/2 |
| 4,120,283 A | * | 10/1978 | Eder | 126/665 |
| 4,135,493 A | * | 1/1979 | Kennedy | 126/577 |
| 4,211,084 A | | 7/1980 | Wallace | 60/641 |
| 4,242,591 A | | 12/1980 | Harville | 310/11 |
| 4,410,805 A | * | 10/1983 | Berley | 290/1 R |
| 4,433,248 A | * | 2/1984 | Marks | 290/44 |
| 4,433,544 A | * | 2/1984 | Wells et al. | 60/641.12 |
| 4,438,341 A | | 3/1984 | Winterbotham | 290/44 |
| 4,452,046 A | * | 6/1984 | Valentin | 60/641.11 |
| 4,452,562 A | | 6/1984 | Hsu | 415/208 |
| 4,499,034 A | | 2/1985 | McAllister, Jr. | 261/109 |
| 4,553,037 A | * | 11/1985 | Veazey | 290/55 |
| 4,691,130 A | | 9/1987 | Gillissen | 310/11 |
| 4,755,352 A | | 7/1988 | Glen | 376/404 |

(Continued)

FOREIGN PATENT DOCUMENTS

DE 3924968 A1 * 7/1991

*Primary Examiner*—Julio Gonzalez
(74) *Attorney, Agent, or Firm*—Lo Tompakov; Galina Tompakov

(57) ABSTRACT

The space-saving, long operating, and cheap vortex plants of large power intensively combine solar, either waste and secondary, or geothermal heating of slightly pressured water with use of wind, giving competitive electricity and water production without firing of fuel, extensive convection collector, mechanical sucking of free air, overstressed moving parts of vortex tower, or large number of air turbines. The embodiments of plants due to different climate and regime include simplified and compacted vortex tower with staged system of forcing and controlling jets of saturated steam along vortex channel, flow-through electric generator with rotated drum or magnetic concentrators, and regime storage at use of waste or geothermal heat, and at use of solar heat under mainly positive ambient temperatures. For starting up and flexible operation during cold winter at absence of wind, solar radiation and hot free air, a compacted off-seasonal storage of high heat density is used for solar heating, storing and flashing of water, and heating and acceleration of saturated steam and wind or sucked air supplying kinetic energy and heat into vortex tower.

3 Claims, 8 Drawing Sheets

U.S. PATENT DOCUMENTS

| | | | |
|---|---|---|---|
| 4,779,006 A * | 10/1988 | Wortham | 290/55 |
| 4,894,993 A * | 1/1990 | Assaf et al. | 60/641.8 |
| 4,935,639 A * | 6/1990 | Yeh | 290/55 |
| 5,096,467 A | 3/1992 | Matsui | 95/269 |
| 5,227,683 A | 7/1993 | Clair | 310/11 |
| 5,381,048 A * | 1/1995 | Baird | 290/55 |
| 5,478,197 A | 12/1995 | Schatz et al. | 415/2 |
| 6,160,336 A * | 12/2000 | Baker et al. | 310/74 |
| 6,215,199 B1 | 4/2001 | Lysenko et al. | 290/44 |
| 6,518,680 B1 | 2/2003 | McDavid, Jr. | 290/54 |
| 6,532,740 B1 | 3/2003 | Sullivan | 60/641.11 |
| 6,590,300 B1 | 7/2003 | Prieto Santiago | 290/55 |
| 6,595,753 B1 | 7/2003 | Illingworth et al. | 416/185 |
| 6,729,839 B1 * | 5/2004 | Illingworth et al. | 415/1 |
| 2001/0048877 A1 * | 12/2001 | Illingworth et al. | 415/208.2 |
| 2002/0162329 A1 * | 11/2002 | Dunn | 60/641.8 |
| 2004/0041400 A1 * | 3/2004 | Mamo | 290/1 R |

* cited by examiner

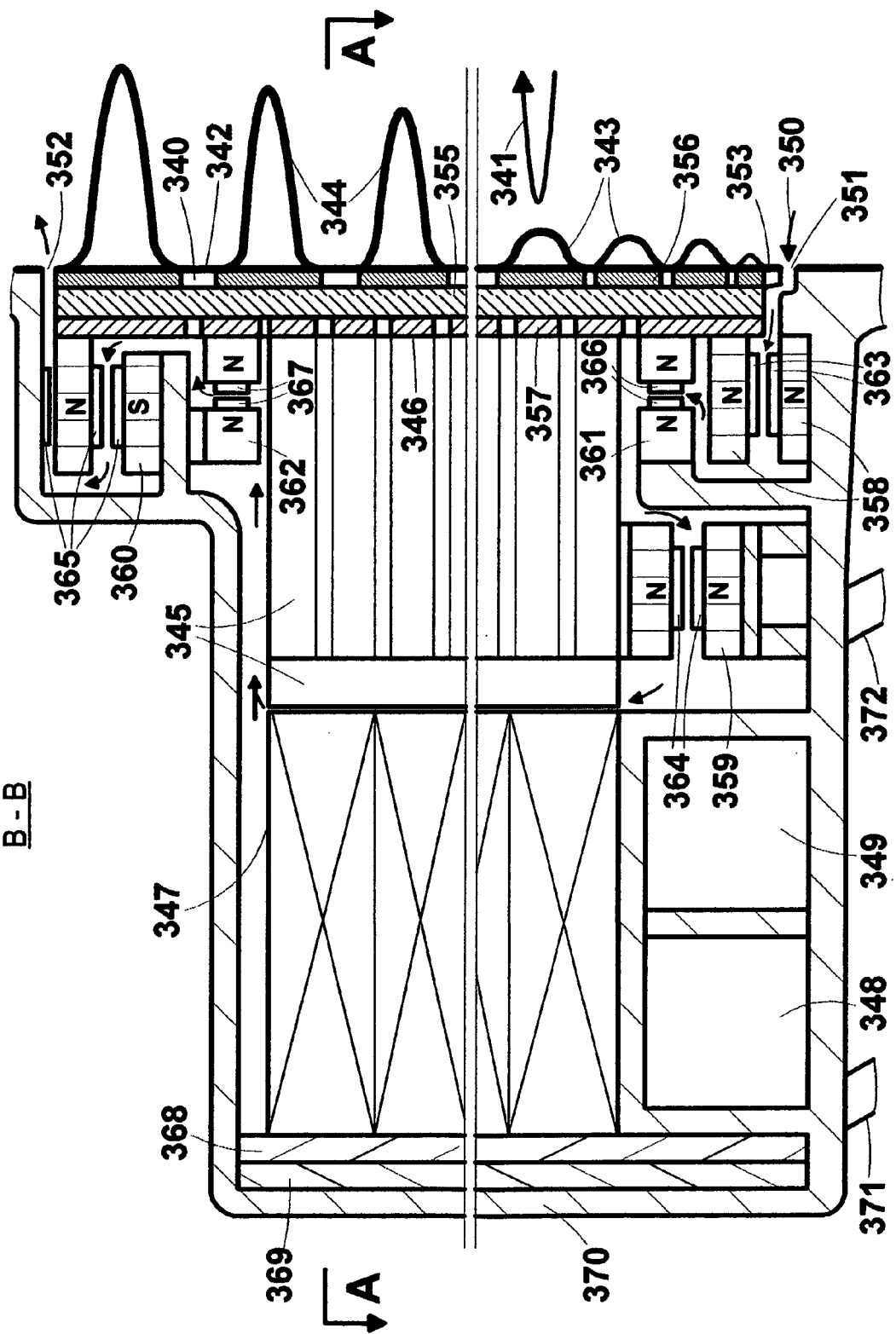

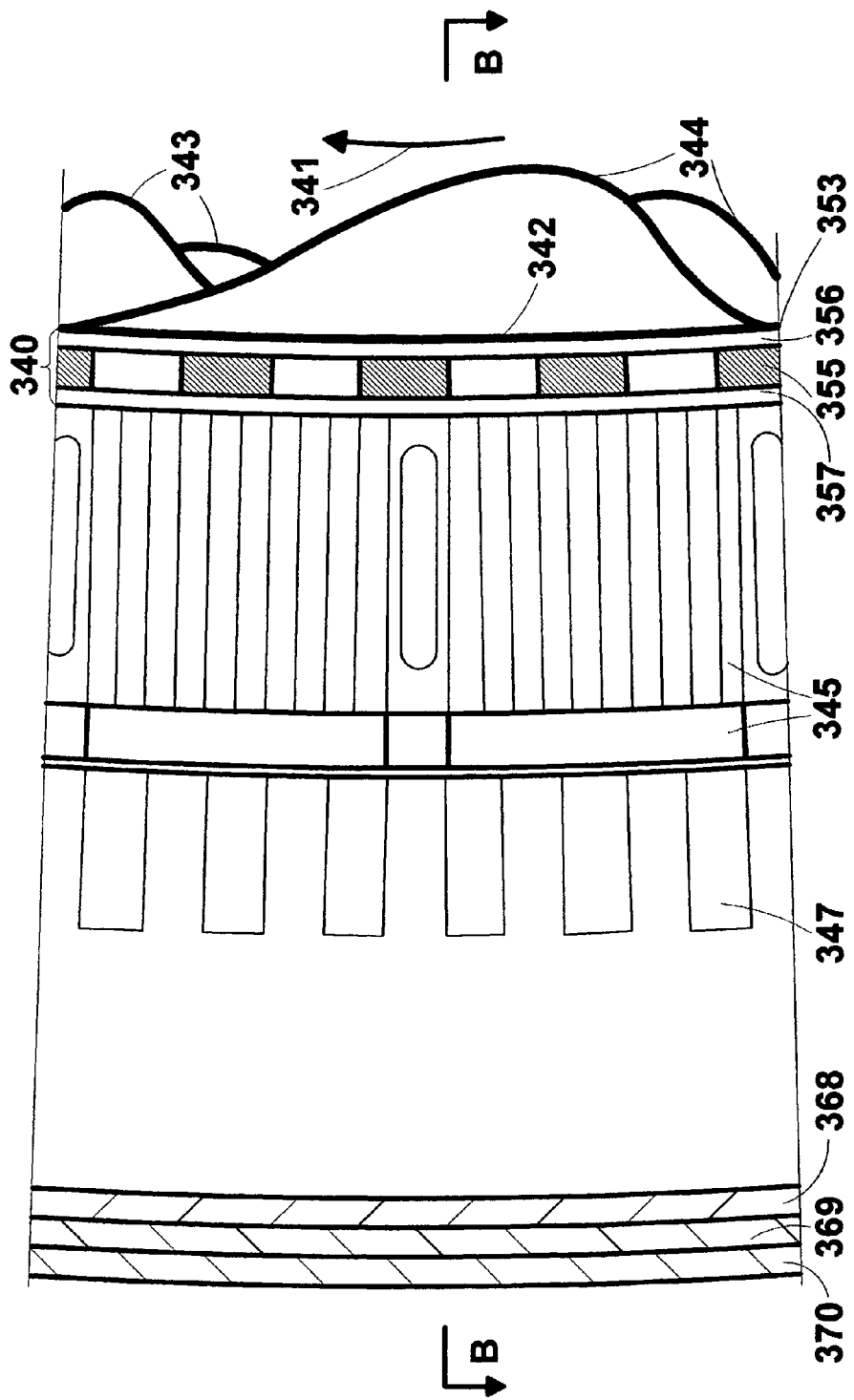

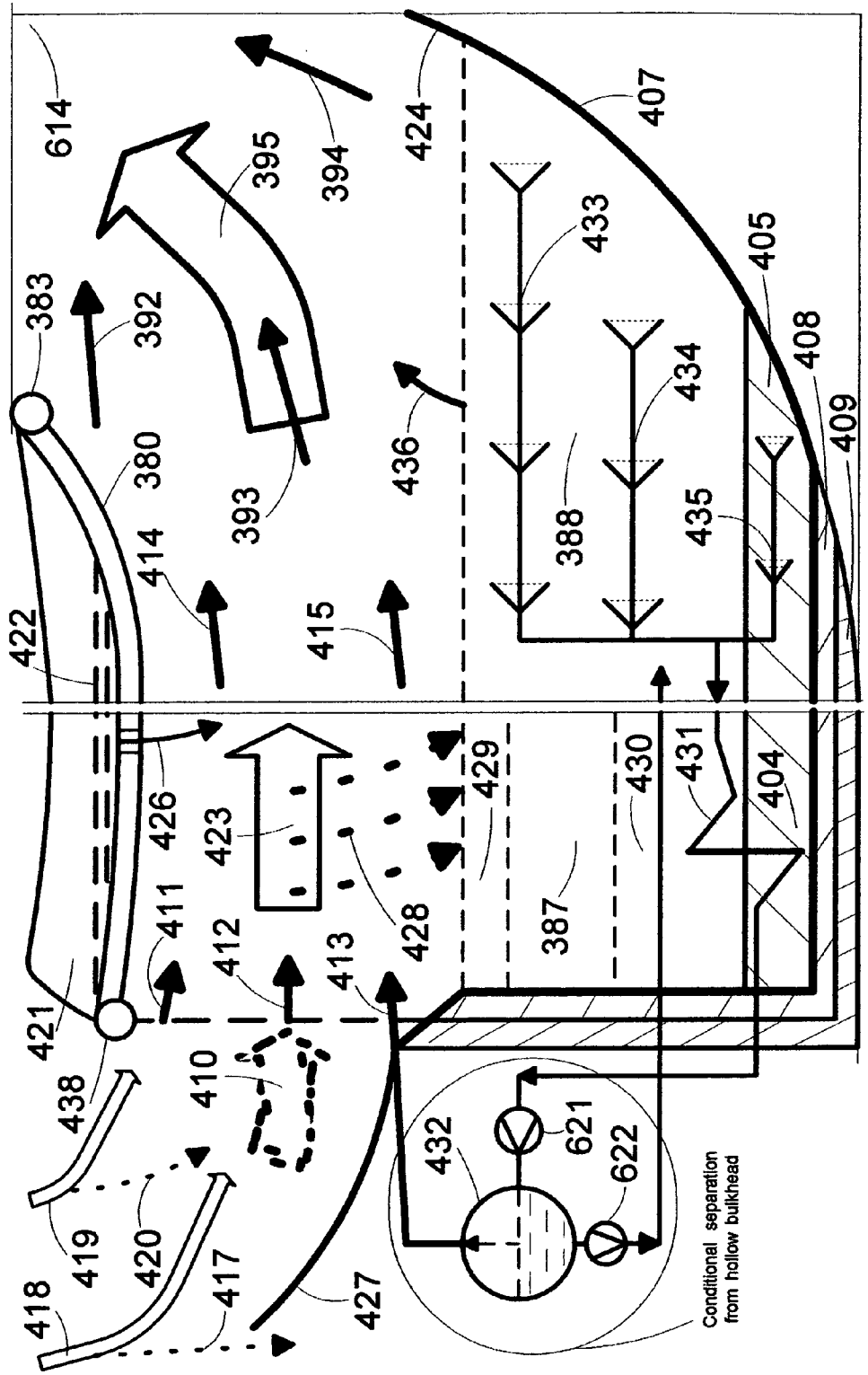

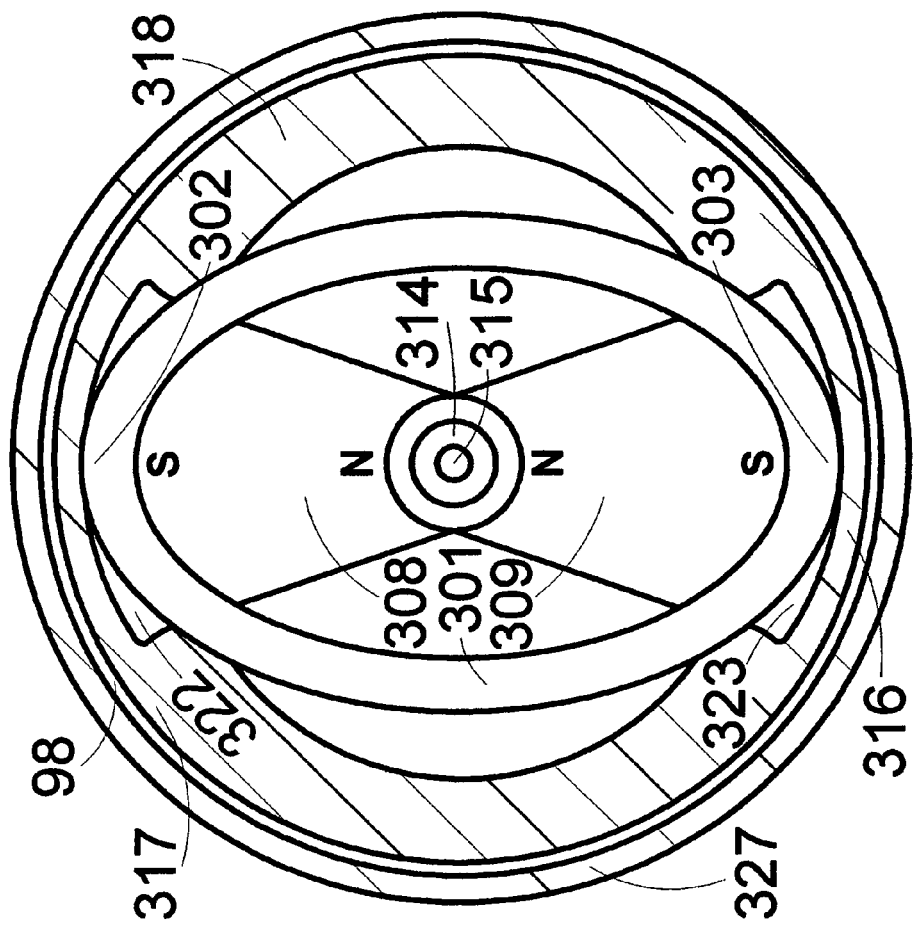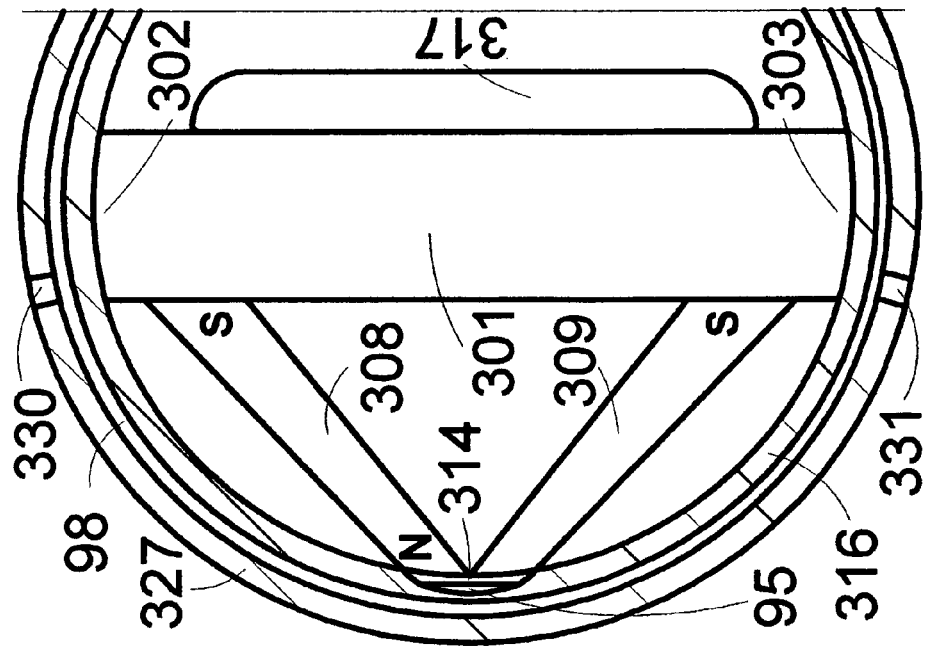

ALL-WEATHER ENERGY AND WATER PRODUCTION VIA STEAM-ENHANCED VORTEX TOWER

This is a continuation-in-part (CIP) to the parent patent U.S. Pat. No. 6,943,461.

BACKGROUND OF THE INVENTION

1. Field of the Invention

It is devoted to space-saving and long operating wind vortex plants of large electric power intensively using solar, either geothermal, or waste heating of water feeding system of steam jets fully forcing vortex flow. The plants can start up and flexibly operate during absence of wind, solar radiation and hot ambient air. They are profitably adapted to different climate and regime without combustion of fuel, extensive convection collector, overstressed moving components of tower, mechanical sucking of air, and air turbine(s) of limited power. More specifically, the new embodiments of plants are adapted to unfavorable conditions including periods of changeable and low ambient temperatures and power loads, partly at cold winter. They include simplified and compacted vortex tower with said system of steam jets, flow-through electric generator with rotated drum or with magnetic concentrators, and regime storage of heated water, or off-seasonal solar heater-storage sucking, accelerating and swirling stagnant ambient air by fast steam jets.

2. Description of the Prior Art

The problem of large-scale and profitable usage of renewable and waste energy sources is complicated by their dispersed and/or low-grade nature with interruptive and changeable input, unfavorable climatic factors, and difference between regimes of input and consumption of energy. Therefore, the large number of low-power wind turbines and photovoltaic units, the same as tremendous and expensive convection towers or previously offered wind vortex towers, cannot be profitable at unfavorable climate and regime. They cannot cover completely, flexibly and cheaply the growing energy demand and replace expansion of thermal and atomic power plants without financial support.

The main problems not solved in the Prior Art to implement vortex power plants are the following: creation of space-saving vortex units of large electric power competitive with other kinds of power plants; sustained use of interruptive and changeable renewable or waste sources of energy without firing of fuel; providing of starts and flexible operation under unfavorable climate and loading without firing of fuel. The attempts to augment attainable power and adapt to unfavorable conditions via supplementary combustion of high-quality fuel in vortex flow, for instance in U.S. Pat. Nos. 4,211,084, 4,452,046 and 4,935,639, cannot solve these problems because of limited power of air turbine and low reliability of moving components inside vortex tower. Combining of vortex unit with diesel or other thermal power plant, as in U.S. Pat. No. 4,433,544, also leads to significant share of replacing fuel and increases total cost. These problems can be solved basing on our invention complementing and exceeding wind kinetic energy by renewable or waste heat partially conversed into large-power vortex kinetic energy. The plant is intensified and compacted using fast steam jets along zones of vortex channel before and after flow-though electric generator, not only in a center of tower base with low rotation moment as in U.S. Pat. No. 6,532,740. We receive fully forced vortex flow without firing of fuel, mechanical sucking of air, overstressed moving components of tower, and air turbine(s) of limited power accepted, partly, in U.S. Pat. No. 4,452,046. These features expand all-weather abilities of the plants invented in the parent patent. The plants can start up and operate during absence of wind and solar radiation at positive ambient temperatures (° C.). For stable operation at low positive and negative temperatures during insufficient or absent wind winds, and solar radiation, it is required higher mass rate of supplementary forcing steam. This is necessary for involving of cold ambient air into vortex tower, intensive heating, humidifying and acceleration of air, vorticity energizing, energy conversion, and removing out of waste air. At inadequate rate can appear an excessive ice limiting or interrupting power generation. Such unfavorable climatic conditions reduce velocities of vortex flow during starting-up and conversion of vortex kinetic energy into electricity in the flow-through electric generator with whirled magnetic concentrators (MACs) invented in the parent patent. Reduction of velocities is going also at given decrease of power load. It changes proportions between centrifugal forces and magnetic repulsion forces of the poles S of MACs, and between weight of MACs and lifting forces of vortex flow. This can lead to deviations from the standard three-phase voltage induced by MACs, taking off MACs from electric generator, and decrease of annual operation time.

Therefore, it is reasonable to make preferred designs of units of the plant for the mentioned wider climatic and regime conditions, including cold winter, and changeable, low and peak electric loads. Such new embodiments of compacted and cheap vortex power plants, which do not fire fuel, and do not use large number of overstressed moving parts and mechanisms of limited power, is the goal of this CIP that was not attained in the Prior Art. Last assertion needs of detailed consideration.

The vortex towers offered previously include too large and not sufficiently reliable guiding, blocking, damping, and accelerating moving structures operating under changeable accelerated airflows, for instance, in U.S. Pat. No. 4,452,046. It is recognized, partly, in U.S. Pat. Nos. 6,215,199 B1, 6,518,680 and 6,590,300 B1. Especially it relates to changeable electric load, temperature, and velocity of involved ambient air giving alternating dynamical stresses and leading to unstable plant operation. At low ambient temperatures, the moving parts as 17 and 18 (FIG. 3) in U.S. Pat. No. 4,452,046, and in other patents mentioned above, can be covered by ice preventing to form, confine, and control vortex flow.

Various sources and ways of heat intake near base of vortex tower were suggested to augment power, for instance, in U.S. Pat. Nos. 4,452,046 and 4,935,639. Partly, U.S. Pat. No. 4,452,046 discloses usage of saturated air 40 and hot water 43 (FIGS. 4 and 5) sucked under kinetic energy of wind, or by blade-type energy converter 24 at absence of wind, which create a depress column drawing in the unsteady heated air generated by the solar face 20. However, the air is not directed and highly accelerated along whole vortex flow to provide forcing kinetic energy replacing and exceeding wind energy, as is made in our invention. Therefore, vortex process and heat usage can proceed interactively only at sufficient wind. Such passive heat intake near base cannot provide starting up at insufficient wind and calm. At absence of solar radiation and decrease of ambient temperature, the heat support decreases and then disappears even under enough wind. The separate solar hothouse 30 in U.S. Pat. No. 4,452,046 with water pipes 39 and 43 will be frozen at negative temperatures (° C.), and combustion of fuel 22 in vortex tower and mechanical sucking of air by blade-type energy converter 24 become unavoidable to continue operation.

In U.S. Pat. No. 6,532,740, at low ambient temperatures, the colder air absorbs heat and kinetic energy of outlet vortex flow 75, 24 generated under Carioles forces for long transition that becomes impossible. The process is not adaptive to load reduction, because the Carioles forces become insufficient for transition. To increase attainable power of vortex plant, usage of several towers interconnected by large air tunnels with many of large switching, collecting, and distributing units in U.S. Pat. No. 4,452,046 (FIGS. 6, 7, 13–18) makes problematical stable operation at changeable loads and air temperatures. Combining with any devices supplying large amount of solar heat into bottom zones of the cyclonic towers does not neglect this limitation of attainable power and longevity of stable operation, because of additional airflows did not control differently the changing zones of several interconnected vortex flows. Artificial winds, created by vortex towers, destroy functioning of neighboring solar collectors. Combustion of fuel in anti-cyclonic towers is useless because of oncoming directions of upward hot gases and downward cold vortex flow. The attempts to support a small, as in U.S. Pat. No. 4,211,084, or a partially confined large-scale vortex flow based on atmospheric convection and artificial near-bottom swirling of heated upward airflow face the problems of too large necessary diameter of air heating collector and swirling camera, large quantity of heating/cooling apparatus and air turbines. Such complex design and vortex flow are inflexible to changeable load and air performance. After passing into unconfined zone, the vortex flow becomes unstable under any wind or change of atmospheric conditions along supposed active atmospheric height of 15–20 km. An attempt to augment power via near-ground heating of air by steam or combustion of fuel increases losses of energy and moisture into the atmosphere, especially at decreasing ambient temperature, and vortex flow decays. Our CIP uses the abilities of system of fast jets of saturated steam to supplement, replace, and exceed not only heat, but also kinetic energy of wind along the zones of confining vortex channel for stable energizing and development of vorticity, sustained support of large electric power, and strict control of tornado-type flow at changeable and low temperatures and loads.

In this CIP are used only outside adjustable vanes under lower inlet velocities of wind or sucked free air. The steam and air nozzles do not contain moving parts under higher inside velocities. It differs from unreliable usage of large moving airfoils 18 in U.S. Pat. No. 4,452,046 (FIG. 3) or inner vanes 16 in U.S. Pat. No. 4,935,639 (FIGS. 3a, 3b) under high velocities of accelerated airflows.

In the parent patent, a flow-through electric generator with rotated magnetic concentrators has a limited lower tangential velocity of outlet vortex flow. It must be higher of tangential velocity of synchronized magnetic concentrators for their stable rotation and induction of standard three-phase voltage. This condition limits decrease of vortex velocity under decreasing power load and air temperature. Therefore, in the CIP is disclosed, firstly, a design of magnetic concentrators preferable for work at decreased velocities of vortex flow. Secondly, for conditions with significant periods of changeable and low ambient temperatures and power loads, and correspondingly lower velocities of vortex flow, is disclosed a new design of flow-through electric generator with rotated drum. The design differs from the design in the parent patent and from the known unconventional kinds. For instance, from generating direct current ionic, MHD, piston, and ferrofluidic generators in U.S. Pat. Nos. 4,064,409, 4,242,591, 4,433,248 and 4,691,130. Such generators cannot be placed reliably near fast whirling vortex core and operate under changeable vortex velocities.

Our generator has no analogs also among the vortex attractors, reversible electric machines providing energy storage, and other electric machines, or mechanical drivers of fluid flows. For instance, in U.S. Pat. No. 6,595,753 the vortex attractor has an impeller with a drive shaft 35 and rotated vanes 31 transferring a torque to rotated vortex flow attracting a back plate 33 with ring structure minimizing parasitic flows into attracting zone of low pressure. This design cannot be used for opposite function of large-scale power generation, so as such impeller can work in the range of too low sizes and vortex velocities for minimizing the parasitic flows (See specification, pages 27, 28). Corresponding spent power is several watts (See page 30). The larger shaft, vanes, and back plate with ring cannot be placed into the zone of high-velocity vortex core of tornado-type flow. They will prevent to rotation of flow of high power and will be destroyed immediately. In design of vortex attractor there is no place also for three-phase stator. It will prevent to reduction of parasitic flows and to constraining of low-pressure region into a desired small location. The additional concentric wall 29 and the ring at the back plate 33 must have enough strength, required for increasing of their thickness with growing sizes. This prevents to necessary electromagnetic interaction between the rotor and stator requiring of minimum air gap.

The similar attempt to make a large-power vortex electric generator from a flywheel structure, for instance used in U.S. Pat. No. 6,160,336, also cannot be realized. The structure can interact with external sources of electric or mechanical power and with outside winds, and cannot interact with internal confined tornado-type flow. There is no place for tornado-type flow inside such design of energy storage, because the flywheel takes up the central place together with supporting, resisting, and guarding structures as 11, 20, 44–46, and 49. The design cannot use directly any kind of heat to support the tornado-type flow at low ambient temperatures and calm, and is incompatible with such flow.

In our CIP, a design novelty and advantage is that the flow-through electric generator has rotated drum with work airfoils and inducing magnets for flexible interaction with whirling tornado-type flow at lower flow velocities than can the generator with whirled magnetic concentrators. An advantage is also usage of bearing magnetic cushions, top and side magnetic suspensions together with guarding rubber rollers as supplementary supports and stabilizers of the rotated drum. The main supporting and stabilizing forces are lifting and rotating forces of upward tornado-type flow acting onto work airfoils. These forces completely or mostly compensate the weight of drum dependent on the power of vortex flow that is augmented and controlled by system of steam jets due to changes of weather and electric load.

In U.S. Pat. No. 6,160,336 are used operating permanent magnets 24 (See page 12 of specification and claims 43 and 44), and magnetic bearings of non-defined kind as alternative decision (Claims 20–22).

In our CIP, the inducing and bearing permanent magnets are combined with electromagnets. Such design yields control of parameters and stability of electric generator, and provides together with guarding rollers reliability of magnetic cushions and suspensions at changeable conditions and vortex velocities.

In addition, the rotated drum is located at periphery of the whirling vortex core having maximum lifting force. The drum has aerodynamic interaction with vortex flow and electromagnetic interaction with adjustable stator of generator, and with magnetic supports at the tower structure. Such design differs from rotated tower 2 in U.S. Pat. No. 4,935,639. This tower is incorporated together with conventional air turbine 23 and generator 24 through shaft into one unit of relatively large weight and height (FIG. 3a and FIG. 3b). Therefore, the air turbine limits an attainable electric power and thus makes uncompetitive the whole design and means for power augmenting. Moreover, too high weight and level of vibrations of such long rotating system with shaft limits possibilities of reliable support and stabilization of generator via magnetic bearings made only of permanent magnets (See last paragraph in specification), especially at changeable weather and loading. Additionally, the rotating system is subjected to high-temperature stressing and corroding from gases after combustion of fuel 12 (FIG. 3b).

For a verse, the rotated drum of flow-through electric generator neglects such limitations and is compatible with means of thermal augmenting of vortex power without combustion of fuel.

An important part of steam-enhanced vortex plant, operating at changeable loads and winter periods with negative temperatures (° C.) and insufficient winds or calm, is a system supplying kinetic energy and heat, without combustion of fuel and/or mechanical air sucking and acceleration accepted in U.S. Pat. Nos. 4,211,084, 4,452,046, and 4,935,639. The off-seasonal heat storage supplies both kinetic energy and heat of airflows and of jets of saturated steam into vortex tower. The design and operation of such accelerating storage at unfavorable conditions is not an obvious task for the specialists in the light of the Prior Art.

In U.S. Pat. No. 4,452,046, mixture of high-temperature gas after combustion of fuel 22 with saturated air 40 inside lower part of vortex tower (FIGS. 4 and 5) destroys and corrodes turbine 24 and other structures, especially at low temperature of saturated air giving low dew point. It is chemically dangerous both at contact of mixture with water in condenser 27 and after exhaust 11. To use expensive internal or external top units for removing of oxides and impurities from gas products, and from airflow with corrosion products means to destroy columnar vortex flow and work of turbines 24 and 9. Rotor of turbine 9 can be broken by accelerated vortex flow. The same relates to fuel combustion offered in U.S. Pat. Nos. 4,211,084 and 4,935,639 (12 in FIG. 3b).

Meantime, the applied in the parent patent combining with low-temperature heating system supplying heated water to vortex tower without combustion of fuel is preferred because yields minimum stresses, quality requirements to equipment, and cost. Moreover, the sucking of tornado-type flow is used through ties of heated water with vortex tower for intensification of heating system, decrease of size and cost, and reduction of auxiliary power and energy losses. The swirling and separating abilities of vortex flow also are used for recirculation and purifying of precipitating condensate. The condensate, separated from condensed vapor of involved ambient air, is used for heating, storing, and controlled flashing with acceleration of directed steam jets. This differs from purifying and heating of additional seawater 39 in U.S. Pat. No. 4,452,046. Corresponding additional exhaust losses of seawater after tower cannot be preferred at water deficit, and additional expenses for desalination of seawater are required.

On the one hand, the referred patents disclose designs that limit an attainable power of the unit through limited strength of overstressed moving structures of tower and conventional air turbines, insufficient adaptation to utilized energy source, changeable weather and regime, and unreliability of tower structures under incompatible combustion of fuel. These designs limit also an annual operation time of tower, because they cannot start up and operate at insufficient winds or calm, absence of solar radiation, and low ambient temperatures, or they use fuel giving low reliability, effectiveness, and ecologic fitness.

On the other hand, the designs with such limitations of power and operation time cannot be combined efficiently with additional heating devices and with devices, which can augment and support power generation longer via storage and intake of excessive heat. These possibilities also did not receive a preferred solution in the Prior Art. Indeed, in U.S. Pat. No. 4,779,006 is disclosed the solar power system of large size and quantity of solar reflectors 38 and stacks 20 containing heating, power generating, and auxiliary equipment. Relatively to large size, the system gives low mass rate of solar heated airflows through fixed inlets 28 with horizontal cross-sections (See FIGS. 2, 7 and 15). The external airflows raise upward after concentrated solar heating (Not showed at drawings). The upward airflows can pass by the horizontal inlets 28 easily, especially at wind. This destroys flow direction from inlets 28 to outlets 30. The main energy of reflected solar rays is concentrated onto outlets 30, 48, and thus their heat can be lost easily into the atmosphere at any wind and decrease of ambient temperature, or under upward convection of solar heated ambient air. The system cannot operate at insufficiency or absence of solar radiation.

The system is incompatible with large-scale heat storage, because of the height of 427 m of top outlets 30 is not suitable to supply a near-ground or underground storage by hot air to heat a storing media. Additionally, the heating by air is low effective at low heat transfer from the air. To accumulate hot air directly requires for too large auxiliary power for air compression, and too large storage. The similar inefficiency and tremendous necessary sizes relate to convection solar heating 21 of wind flows 6, 15 through the surface 20 in U.S. Pat. No. 4,452,046 (FIG. 4), and wind flows 4 in U.S. Pat. No. 4,935,639 (FIGS. 3a, 3b), which also cannot be stored, or need of compression under high auxiliary power.

In our CIP, the water is heated directly by solar rays, stored for a long time in the shut solar ponds having materials of high heat density, and used for controlled flashing with directed acceleration of jets of saturated steam through stages of nozzles. The stages are located in the radial bulkheads forming air channels between transparent solar roof and water surfaces of ponds of the storage, and then along vortex channel. This gives, first, kinetic energy of crossing airflows sufficient for vortex energizing and support with large-scale power generation at the mostly unfavorable weather conditions. Water has several orders higher heat transfer and specific heat value than air. It can be easily stored together with accumulating/releasing materials of high heat density. The steam jets received after water flashing give high kinetic energy and latent condensation heat yielding decrease of storage size, with low demand for auxiliary power under vortex sucking. For heating and acceleration of wind or stagnant air, the sucking and forcing steam jets are used, together or without solar radiation, via directing contact swirling that yields intensified heat and mass transfer. However, not via weak passive convection transfer from air 6 and 15 to accumulating materials 45 as in U.S. Pat. No. 4,452,046, using sucking of air 6 and 15 by turbine converter 24 consuming electricity from power system. The pond 44 with preliminary heated water 43 is separated by thick wall from these materials and from solar rays 21. Water 43 and humid air 40 cannot produce high-power kinetic energy. For a verse, they are subjected to mechanical sucking from the same turbine converter 24 (columns 3 and 4 of specification, FIGS. 4 and 5).

The principal difference of storage in our invention is actively intensified process, and design producing both high-power kinetic energy and concentrated heat without mechanical drive and firing of high-quality fuel. Partly, the difference from patent DE 3924968 A1 using outside wind turbines 22–25 at the tower, air turbine in the tower, and peak hydraulic turbine 18 needing of large water storage with pumps 20, is also the following. In our invention are used the wind energy and the heat energy from any one or two compatible water heating source(s) just in one the same single working process dependently on changeable weather and power regime. It has the compact water heating system with single heat storage-water heater functioning simultaneously as strict accelerator of steam and air or wind. Moreover, it has the single flow-through electrical generator of high power located in compacted tower with intensified tornado-type flow. In patent DE 3924968 A1, the increase of rated wind, hydraulic, or air power can be achieved through simultaneous increases of the number of wind turbines, tower height and diameter, water storage, and auxiliary power of pumps. It gives exceeding raise of the limited over-stresses and cost of these components. The inlet velocities of ambient air sucked by inner flow can exceed the maximum velocities limited by stresses of near located wind turbines. Solar heating of air in patent DE 3924968 A1 is low effective, especially at fast peak loading, because of weak heating of air and absence of air storage. The attempts to use the air as a single media for combined usage of wind and solar energy without long time heat storage give the similar limited results even at favorable climatic conditions, and especially at unfavorable or intermediate conditions. For instance, in U.S. Pat. No. 4,433,544 the favorable average wind velocity and solar radiation are supplemented not by regime or off-seasonal storage of solar heat, but by a short-term storage comprising black body 40, and by fuel-powered diesel 56 (FIG. 4 and FIG. 7). At unfavorable conditions requiring of larger amount of stored heat, the black body 40 becomes ineffective because of low accumulation capacity and low heat transfer to the air. The diesel 56 becomes the major power producer via fuel combustion. At use of air, power output is limited by size of circular structure. The authors define height as approximately between 35 and 80 feet (Claim 13). Both radial and axial air turbines 34 and 48 are mounted on the same shaft 26 together with electric generator 28 and gearbox, and alternatively with a clutch. Such decision limits height of the structure, and total power output is limited by the level of 12–13 hp (Column 8 of specification). Such design cannot be satisfying for large-power plant, especially at unfavorable and intermediate climate and regime. At the calm, too weak convection acceleration after solar heating of air 44 cannot support necessary power output.

It is seen from analysis above that more effective heat accumulating/releasing and air accelerating media and design decisions are necessary due to unfavorable climatic and loading conditions. They are not disclosed in the Prior Art. Partly, the double-glass solar-heated surfaces with air inside were widely used for thermal insulation in the windows of buildings in the cold regions, and for heating of air behind these surfaces by passing through solar rays. For instance, in U.S. Pat. No. 3,935,897 the double or triple transparent glazing 34 with distanced insulated opaque copper or aluminum plates 32 are used in the collector panels at the buildings as insulating means for minimizing of heat losses at the winter, and minimizing of solar heating at the summer. In U.S. Pat. No. 4,120,283, the solar collector formed by sheets of reflecting aluminum foil 21, 24 uses solar rays that cross and heat double-glass sheets 26, 27 with incoming air between them. The air heats further the distanced pipes 16 with domestic water. A group of collectors forms a natural circulation system together with air in a building and gives air and water temperatures several times lower of 100° C. The foil cannot support temperature of 100° C. and higher for off-seasonal water storing at unfavorable climate. Use of double-glass heating of air and then convective heating of water by air through pipes is ineffective, relative to direct solar heating of water in double-glass surfaces disclosed in our CIP. Sizes of water tracks and pumping losses are several orders smaller. Therefore, the air heating designs acceptable for small collectors are not effective for large-power storage making simultaneously heating, humidifying, and directed acceleration of media into vortex tower.

In our CIP, solar rays directly heat just water in streamline double-glass surface and in shut ponds below. The water is stored in the ponds with accumulating/releasing materials of high heat density, and is used for flashing with acceleration of steam jets into air channels and into zones of vortex tower. In referred patents there are no analogues water heating surfaces with modules having controlled collectors to maximize total solar insolation, moreover serving as solar roof for storage of hot water and for channels that humidify, heat, and accelerate the wind or sucked stagnant air by both solar rays and steam jets. Saturated steam received from flashed water gives high latent condensation heat and kinetic energy of accelerated jets, relatively low sizes and cost of the storage and tower, and reduced demands for auxiliary power. Accelerated wind or ambient air gives similar effects after forcing by steam jets with augmented attainable power and longevity of annual operation time. Such single storing, heating, humidifying and accelerating system, and the single flow-through electric generator with rotated drum in vortex tower, are adaptable to the regions with cold winter and changeable loads including peak, intermediate, and minimum loads. This multi-layer streamline design has principal differences relative to disclosed in U.S. Pat. No. 4,894,993 open solar pond providing heating and storing of salty water in torrid zone.

It is reasonable to underline that no one combination of the patents referred above yields possibility to solve effectively the complex of problems mentioned above.

For instance, a combination of the Valentin's U.S. Pat. No. 4,452,046, Wortham's U.S. Pat. No. 4,779,006, and Eder's U.S. Pat. No. 4,120,283 cannot satisfy to the demand for all-climate, all-weather, and all-regime sustained operation without combustion of expensive fuel of high quality, at low plant size, cost, and prices of electricity and water competitive with conventional and new kinds of large-power plants. Relating to every of these patents we show above that attainable unit power is limited by attainable power of air turbine or blade-type energy converter, by limited sizes of overstressed moving components of Valentin's tower, and by tremendous size of connections, material expenses and auxiliary power at combining of several Valentin's towers having solar canopies, several Wortham's top parts of devices having field of solar reflectors, and increased Eder's solar surfaces for Valentin's solar collectors. We show, that these units are not compatible at combining into one power station, because they cannot be built and function together at one site, and destroy process one to another, especially at unfavorable climate and regime. Combustion of fuel in Valentin's cyclonic towers cannot solve these problems. Indeed, Valentin asserts that system "can be installed at any location" (column 1, lines 11–12) and that it is possible to use the device in different ambient conditions (column 1, lines 36–43). However, from explanation to FIG. 4 is seen that this feature is provided via combustion of high-quality fuel 22 in the tower and use of energy of hot gases after combustion for driving of blade-type energy converter 24 sucking air. In description to FIG. 6 Valentin explains that a system of several towers is completed and improved by a combustion module 55 provided with burners 54 to supply energy when the climatic conditions do not assist operation of system. It is seen the fuel basis of relating limitations in claims 1–7. Hoverer, we show above, that combustion of fuel in the tower cannot increase attainable power higher of limitation for air turbine, and reduces reliability, economic efficiency and ecologic fitness, especially at unfavorable conditions. It cannot prevent to freezing of structures and destroying of process at low ambient temperatures. This gives limitation of annual operation time. For operation at such conditions it is necessary off-seasonal storage of hot medium having materials of high heat density and able to supply large-power kinetic energy and concentrated heat into vortex tower. Additionally, are necessary special design decisions preventing to freezing, as our hot steam jets replacing overstressed moving structures and heating inlets of the storage and tower. The combined designs have not adequate large-power electric generator, and effective decisions for multi-functional off-seasonal storage and preventing means. Moreover, we show above that their combining brings ineffective raise of total size, material expences, and auxiliary power, instead of total compacting, cheapening, and competitiveness.

Our invention meet the non-obvious problems discussed above. It disclosures the preferred embodiments of the compacted, cheap, and competitive steam-enhanced vortex power plants using renewables or waste heat at various climatic and regime conditions, including cold regions. These plants can give radically larger attainable power, longer annual operation time, and lower size, cost, and prices of energy and water relative to the known kinds of plants. They can operate without fuel firing, extensive convection collector, mechanical sucking of air, large number of overstressed moving parts of tower(s), or air turbine(s) of limited power. These features reduce dynamical stresses and deviations, and raise controllability, safety, and ecological fitness of vortex power plants.

SUMMARY OF THE INVENTION

The steam-enhanced vortex plant of high electric power uses wind and alternatively has available one or two from the solar, geothermal, waste, and secondary heat sources. The plant is intensified, compacted, and adapted without combustion of fuel to starts and long operation at unfavorable climatic and regime conditions. The preferred designs of plants with simplified and compacted vortex tower having flow-through electric generator with rotated drum are disclosed. The drum has multistage laying and half-laying work airfoils interacting with peripheral layer of vortex airflow on the inside, and has inducing magnets on the outside interacting with switched modules of surrounding three-phase stator. The upward vortex flow slightly lifts the rotated drum through interaction with work airfoils so that are necessary only supplementary bearing magnetic pillows, top and side magnetic suspensions, and guarding rubber rollers. The inducing and bearing permanent magnets are combined with controlled electromagnets for flexible operation. The drum can operate at decreased velocities of vortex flow. Control of generator and vortex flow at changeable weather and regime is enhanced by system of controlled steam jets in the zones of vortex channel before and after generator. The tower is simplified and cheapened relative to the tower in the parent patent and has not outside water circuits, which can be frozen at winter.

The plants with closed off-seasonal storage of hot water having solar heating and directed acceleration of steam and wind or sucked ambient air are disclosed due to regions with cold winter and changeable regime during insufficiency or absence of wind and sources of heat. The transparent double-glass roof of the storage comprises of modules directly heating water passing between two glass sheets. Controlled collectors, which regulate water rate dependently on solar radiation and wind, connect the modules. The ponds with pure water and ponds with salty water are located concentrically under the roof for heating by solar rays passed through the roof. The materials of high heat density are placed together with water tubes at the bottom of the ponds for long support of higher temperature of stored water. The hollow radial bulkheads support the roof and form the constricting channels for acceleration of the wind or sucked ambient air into the central vortex tower. The steam jets make supplemental heating, humidifying, and acceleration of centripetal airflows via steam nozzles with feeding flash-off drums mounted into the hollow bulkheads along the channels. This gives radically stabilized and intensified process in the compacted storage and vortex tower with large attainable power and longevity of annual operation time. For regions with intermediate climatic and loading conditions, the plants having generator of the parent patent and using preferred magnetic concentrators with ellipsoidal core and two magnets are disclosed. Relative to the known kinds of power plants, the fully green steam-enhanced vortex plants can provide larger unit power from 50–100 up to 1,500–2,000 MW, and equivalent annual operation time of 3,500–6,500 h/year at use of solar heat and wind, or up to 7,000–8,000 h/year at use of waste and secondary, or geothermal heat and wind. Water production of unit can amount 1–50 million $m^3$/year and higher. Additionally, the limits of use of wind, renewable and waste heat for effective power generation are widened at heating of water only to ~100° C., despite of ~400° C. at solar thermal plants. The plants can give several times lower size and specific cost, and the lowest prices of electricity and water at various climate and regime conditions without combustion of fuel. They can profitably cover the growing energy demand, and perfect energy balances and ecological features of large industrial works, and of thermal and atomic power plants. This is the profitable way of large-scale usage of renewable and waste energy at the nearest time applying conventional materials, manufacturing lines, and building technologies.

BRIEF DESCRIPTION OF THE DRAWINGS

FIG. 2 is a schematic vertical section of the flow-through electric generator with rotated drum.

FIG. 3 is a schematic plane section of the flow-through electric generator with rotated drum.

FIG. 5 is a schematic vertical section of off-seasonal heat storage showed at cold winter.

FIG. 6A is a direct view of the modified magnetic concentrator (MAC) with ellipsoidal magnetic core and two permanent magnets, showed after cut-off nearer half-spheres of two shells.

FIG. 6B is a left-side view of the same MAC after cut-off nearer half-spheres of the same two shells.

DETAILED DESCRIPTION OF THE INVENTION

Figure 1A:
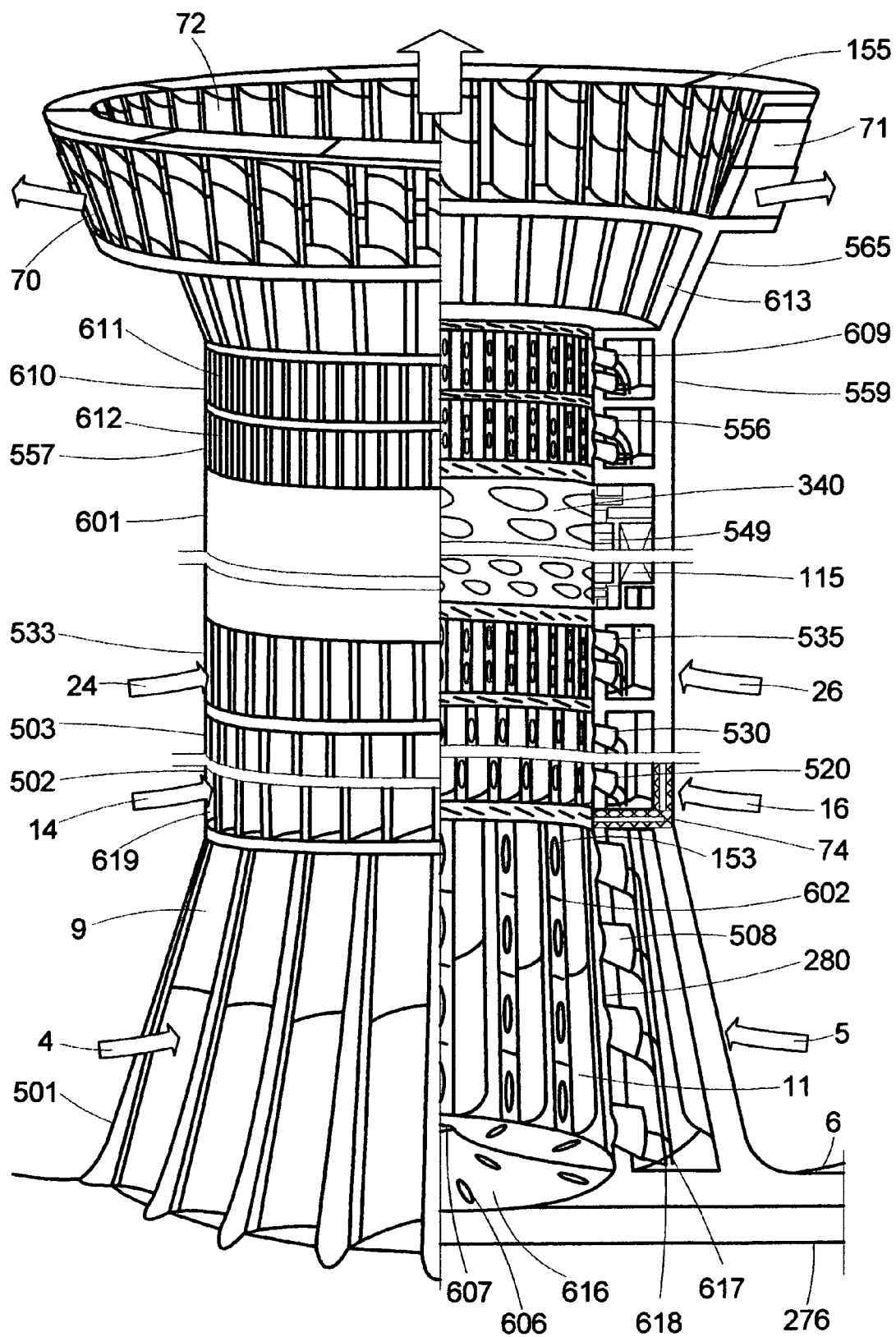
FIG. 1A is a general view of the steam enhanced vortex tower with rotated drum at calm.

This invention discloses steam-enhanced vortex plants of large power long operating at various climatic and regime conditions without combustion of fuel. The preferred embodiments of the plants are the next: 1) The first plant embodiment is meant for climatic zones having significant periods with intermediate and slightly negative ambient temperatures (° C.), and intermediate and low power loads. The subsystems are the same as in the first embodiment of the plant of the parent patent, excluding replaced electric generator with rotated magnetic concentrators (MACs) and relating units and subsystems. A new kind of flow-through electric generator with rotated drum replaces them.

The replaced units and subsystems are the injector and separator of MACs, and external control and maintenance subsystems for MACs with channels filled by condensate for transporting of MACs. The external water subsystems are absent, and process demand for the condensate is significantly shortened. This is important at negative ambient temperatures (° C.), when condensate can freeze, and absolute humidity of cold ambient air can be insufficient for condensate replenishment. Lower average humidity and demand for condensate allow exclude large traps catching the condensate in the tower, and reserve only the compact slot collectors for centrifugal capturing of precipitating condensate.

These replacements and exclusions simplify design and decrease height and cost of vortex tower. Lower location of generator with rotated drum and magnetic supports reduce dynamic stresses in tower structure. 2) The second plant embodiment is adapted to the long cold winter, and low and peak changeable loads via usage of solar and wind energy, which can be complemented by waste or geothermal heat, if any. The near-bottom part of vortex tower of the first embodiment is connected with off-seasonal heat storage having heat accumulating/releasing materials and delivering accelerated and heated airflows, fast steam jets, and heated water into the tower. The storage has controlled solar heated modules covering solar ponds, steam nozzles fed by flash-off drums, and radial air channels with vortex tower in the center. Therefore, simultaneously the storage is the solar heater of water and air, humidifier, and accelerator of wind or sucked ambient air into tower by steam jets replacing and exceeding kinetic energy of wind. 3) In the third plant embodiment, the subsystems are the same as in the first embodiment of the plant of the parent patent. However, the types of rotated magnetic concentrators (MACs) of the flow-through electric generator are added by new modification with ellipsoidal high-permeability core and two concentrating magnets. This modification is adapted to stable operation at lower velocities of vortex flow caused by intermediate ambient temperatures and power loads staying significant part of the annual time. The plant of the first embodiment has a steam-enhanced vortex tower comprising a vortex energizer 501 located near bottom of a vortex channel 280, one or more swirler(s) as 502, 503, and 533 above, an electric generator 601 with stator 115 and rotated drum 340 having inducing magnets 549, one or more re-enhancer(s) as 557 and 610 above the electric generator, and a top diffuser 565 (See FIG. 1A). A system of alternate steam and air nozzles forms said vortex energizer, swirler(s), and re-enhancer(s). Hollow streamline columns surround vortex channel, support it, form the stretched air nozzles, and contain controlled flash-off drums with fed steam nozzles as 153, 508, 520, 530, 535, 556, and 609, hot water piping as 617 with control pumps and fitting, and piping for removed condensate as 618 with control pumps and fitting. The steam nozzles have stretched outputs into vortex channel and accelerate jets of saturated steam quasi-tangentially-and-upward, supplementary replace, and exceed action of wind. The air nozzles have inlet adjustable vanes as 9, 11, 611, 612 and 619, accelerate wind or flows of ambient air as 4, 5, 14, 16, 24 and 26 sucked by vortex flow, and direct them quasi-tangentially-and-upward into vortex channel. The columns together with strengthening rings support vortex channel and surrounding equipment.

The steam jets have outlet pressure controlled between ambient pressure and lower pressure inside vortex airflow. They suck, force, and accelerate inlet flows of captured wind or sucked stagnant air through air nozzles into vortex channel under pressure drop created in vortex flow and supported by the steam jets. This process is augmented by kinetic energy of accelerated steam, and via latent condensation heat of saturated steam partially condensing and conversing into directed kinetic energy at mixing with colder vortex airflow. It gives inlet and inside air velocities several times higher of rated outside wind velocity, and vortex power one-two orders higher than at average annual wind velocity and same size of channel. The inner surfaces of the hollow tower columns, and the supporting rings between units of vortex channel, have slots as 602 collecting drops of condensate, which precipitate from partially condensing saturated steam and saturated air, and move to periphery under centrifugal forces. The collected condensate is used partially as a cooler of isolated conductors and magnets of electric generator, and is directed after the slots and generator into a heating system for water replenishment.

The heating system uses water heaters with regime storage of heated water providing daily, weekly, or longer operation dependent on climate and regime. The heaters heat slightly pressured water without boiling up to ~100° C., or higher for starting up. The heated water is used for generation of steam in flash-off drums feeding the steam nozzles. The heaters have alternatively one or two from solar, either geothermal, or waste and secondary sources of heat available in local conditions. These heaters are intensified and compacted via sucking of heated water by vortex flow through outlet water piping, giving increased water velocities and heat transfer, and allowing use cheap construction materials and fabrication and maintenance technologies.

The heaters using solar radiation include first stage with long water-cooled cylinder parabolic reflectors and second stage with water-cooled collectors of large diameter at several discrete steps of daily one-axis orientation on sun.

At usage of waste source of heat, it can be complemented by another waste or secondary source of heat available at the same factory or power plant, thus providing operation at negative ambient temperatures (° C.). Waste heat rejected with water can be utilized directly or after purifying of water, and waste heat rejected with other medium can be utilized through water heating tubes in the regime storage.

The regime storage of heated water is made as solar pond that is open, or is shut by transparent roof, and has series sections of colder, warmer, and hot water gathered from surface of said sections.

The waste source of heat, if any, can be added by another waste or secondary source of heat available at the same factory, either thermal electric station, or atomic electric station, thus providing long operation at negative ambient temperatures. The waste heat rejected with water can be used directly or after purifying. If the waste heat is rejected with other medium, it can be utilized through water heating tubes. The drum 340 of vertical electric generator is flow-through and is rotated by vortex flow 341 that passes upward through the drum (See FIGS. 1A, 2 and 3). The drum has the following work sides:

a) On the inside 342 are located stages of work airfoils as 343 and 344 conversing kinetic energy of the vortex flow 341 into kinetic energy of rotated drum through action of quasi-tangential and axial forces and through pressure drop created in steam-enhanced vortex flow 341. The rotated wall 353 at the drum 340 detaches the drum from the vortex flow 341.

b) On the outside 346 are located magnets as 345 inducing three-phase voltage in circumferential switched modules of conductors 347 of a three-phase stator supported by tower structure.

Additionally, the magnets as 358–362 of magnetic cushions and suspensions are located on the outside of the drum 340 and at case 370 of stator.

The switched modules of conductors 347 are located around periphery of the drum 340 with magnets as 345. The modules can be switched in parallel and in series via outside switching subsystem 348. They are insulated and cooled in parallel via condensate from collectors 349 and via air cooler 350. The air cooler 350 bypasses the generation zone of vortex flow 341 through inlet opening 351 and outlet opening 352 at periphery of rotated wall 353.

Voltage induction is made through alternating magnetic whirl created by alternate poles N and S of the magnets as 345. The magnetic whirl crosses the conductors 347 of surrounding three-phase stator and thereby induces the three-phase voltage. At vortex plants with base or half-base regime of power loading, the permanent magnets are preferred for voltage induction, simplifying design of rotated drum. In this case, the generator is controlled through change of forces of vortex flow 341 by adjustable inlet vanes of swirler(s) and re-enhancer(s), by steam jets in vortex zones before and after electric generator, and by switching subsystem 348 of switched modules of conductors 347. For vortex plants with changeable half-peak regime and significant share of winter negative temperatures, the inducing permanent magnets are combined with electromagnets controlling voltage and power.

The carrying flame of the drum 340 comprises arranged in a circle vertical stiffening beams as 355 connected by inner and outer strengthening horizontal rings as 356 and 357. The inner rings as 356 bear and fix symmetrically the rotated wall 353 and work airfoils as 343 and 344 on the inside of this wall. The outer rings as 357 bear and fix symmetrically the groups of inducing permanent magnets and controlling electromagnets completing the magnets 345. The lowest outer ring carries the isolated current leading collectors for groups of the controlling electromagnets and for electromagnets of the bearing magnetic cushions as 358, 359, 361 and 362, and of magnetic suspensions as 360.

The multistage work airfoils as 343, 344 realize tangential and axial momentum of the vortex flow, and pressure drop created in the vortex flow. For flow-through drum rotated by vortex flow can be used at least the next kinds of the work airfoils:

(a) laying airfoils 343 on the inner rings as 356 at the lower part of drum 340, facing the highest velocities of the vortex flow 341; (b) half-laying airfoils 344 on the inner rings as 356 at the higher part of the drum 340, or at similar second drum that can be located above the drum 340.

The second drum can use lower velocities and momentum of the vortex flow because it has reduced angular velocity. The angular velocities of both drums are constant and synchronized in the electric power system. They represent the divisors of 3000/3600 revolutions per minute for synchronous induction of the standard three-phase voltage through definite given number of pares of magnetic poles of the inducing magnets at every drum. Such two-drum design is preferred for vortex plants of large power at sharply changeable weather and loading conditions.

The laying airfoils as 343 preferably have streamline waveform of vertical longitudinal cross-section with half-spheroid form of the vertical cross-sections, and have height smaller of half of the footing width.

The half-laying airfoils as 344 preferably have streamline waveform of vertical longitudinal cross-section with half-ellipsoidal form of the vertical cross-sections and height close or larger of half of the footing width, but smaller of twice width. The higher height of the half-laying airfoils as 344 is preferred under lower quasi-tangential velocities of vortex flow giving lower rotating forces and stresses in the airfoils. Length of both kinds of airfoils is several times larger of their height, providing continuity of the airflow passing on and passing from the surfaces of airfoils and rotated wall 353. The airfoils are hollow and can be strengthened by inner fins. The airfoils are made of low-temperature blade steels or strengthened plastics. The airfoils as 344 can have front and ghost streamline holes reducing eddy losses. Both kinds of airfoils have roots in the inner rings as 356. The roots envelop the whole perimeter of airfoil foot.

The profiles of airfoils as 343 and 344 partially compensate centrifugal forces by centripetal wing effects in the vortex airflow. Simultaneously, weight of drum 340 with carried units is compensated by lifting forces of vortex airflow, and by magnetic cushions as 358, 359 and magnetic suspensions as 360. Small ribs at airfoils can increase lifting forces and reduce aerodynamic losses. The ribs of the first and last stages of airfoils can be adjustable due to character regimes of the vortex power plant.

The drum 340 can have additional correcting and stabilizing side magnetic cushions and vertical magnetic suspensions located along the drum height between sections of the stator and on the drum. The cushions and suspensions have symmetrically located permanent magnets and correcting electromagnets controlled for reliable rotation without friction. Self-aligning rollers as 363–365 and correcting rollers as 366, 367 guard the supporting and radial cushions and suspensions. The rollers are made of shock-absorbing rubber. During operational rotation, the drum 340 is lifted together by vortex lifting forces acting on airfoils as 343, 344 and by the cushions and suspensions, unloading the rollers as 363–365. The radial rollers as 366, 367 also are normally unloaded. They correct the deviations of the drum rotations during sharp changes of power loading and weather. Thereby they support the control action of the correcting electromagnets.

The specific carrying surface of magnetic cushions and suspensions is several orders of magnitude larger than specific bearing surface of low-speed hydroelectric generator of the same rated power. Together with lower centrifugal forces reduced under centripetal wing effects of the work airfoils, diameter of rotated drum as 340 can exceed up to an order over the limits characteristic for rotors of hydroelectric generators. The generator has wave insulation 368 and 369 located into carrying steel case 370 that has bearing brackets as 371 and 372 used also for separate laying of electrical and water ties.

Intensive cooling of rotated units of drum by cold air bypassing vortex core supports high power rate and efficiency of electric generator. The same relates to parallel cooling of modules by condensate and air. The drum and stator of generator are made precisely symmetrical relative to central axis of generator. The flow-through electric generator with rotated drum is preferable at low velocities of vortex airflow, corresponding to partial power loads, and at intermediate and low ambient temperatures, staying during significant periods of a year. A cause is that the drum has lower permissible tangential velocity of vortex airflow at periphery of outlet flow than permit the whirled magnetic concentrators in the generator of the parent patent. Additionally, the magnets fixed on the drum rotate synchronously at any regimes. Functioning of the plant of first embodiment is the same as for the plant of first embodiment in the parent patent. The differences and advantages of generator with drum under unfavorable conditions are the next: the condensate in units of tower has smaller mass that accelerates their preliminary filling and heating up; the time of starting up is shortened via exclusion of separators of condensate and subsystems with magnetic concentrators;

there are no outside subsystems filled by condensate and subjected to freezing at the winter; the generator with rotated drum can work in motor regime that accelerates first steps of starting up.

The most difficult starting up at calm and low ambient temperature begins from the upper part of vortex channel having minimum air column for vorticity energizing. The first stage begins from the steam nozzles with flash-off drums as 609 and 556 of the upper re-enhancers as 610 and 557 at shut air vanes as 611 and 612 (FIG. 1A). The side air vanes as 70–72 and 613 of diffuser 565 also are shut, the same as vanes of lower swirler(s) and vortex energizer. Simultaneously, the generator starts to work in the motor regime sucking and swirling the air from the lower part of the vortex channel and forcing the air into the higher part and into the atmosphere. It allows open gradually the air vanes starting from the upper vanes as 611, 612 and down to near-bottom vanes as 9, 11, and to switch-on gradually the flash-off drums feeding steam nozzles as 535, 530, 520, 508 and 153 of swirlers as 533, 503, 502, and then 501 under motor regime, developing vortex flow in lower part of the channel. Steam jets direct inside air helically creating rotation moment and decrease of air pressure. Following to development of vortex flow with pressure decrease along height of channel, a controlled pressure of jets can be reduced to sub-atmospheric level between higher pressure of ambient air and lower pressure of swirling air in the channel.

At lower ambient temperatures and correspondingly higher necessary steam rate and velocity, the steam condensation, heat and mass transfer to swirled airflow, and expansion of mixture go rapidly under higher gradients of temperature and velocity, thus increasing additionally angular momentum and accelerating starting-up. Moreover, the process accelerates under higher difference of density between colder ambient air and inside mixture of hot steam with heated air. The velocities and mass rate of inlet sucked air and angular momentum of vortex flow increase together with raise of steam rate up to the level, when electric generator can pass into generation regime, and further to attain the rated or given partial power.

At second stage, the tornado-type flow is stabilized enough for sustained support of power generation.

The source of energy for developed vortex flow and useful power generation becomes latent condensation heat and kinetic energy of injected steam utilizing available heat source. Alternatively it can be solar, either geothermal, or waste heat, dependent on local conditions.

During starting-up, the regimes of electric generator with rotated drum 340 are the next (FIGS. 2 and 3):

(1) Switching-on of electromagnets in supporting magnetic cushions and suspensions for partial unloading of rollers as 363–367 bearing the staying drum.

(2) Switching-on of series modules as 347 of stator into electric system with raise of voltage up to rated level, using controlling active and reactive resistances. Switching-on of parallel modules with raise of current and density of magnetic whirl interacting with magnets as 345 giving rotation moment to drum.

(3) Initial untwine of the drum on the rollers 363–367 by growing alternating magnetic whirl created by stator in the motor regime. The rotation moment of the drum starts to transmit through airfoils as 343 and 344 to the air of vortex channel inside the drum.

(4) Synchronizing of rotations of the drum in the electric power system with simultaneous forcing of air.

(5) Passing into generation regime under increasing angular momentum of vortex flow 341 via steam jets.

(6) Increase of electric power up to given level. The airfoils as 343 and 344 receive raising rotation moment under tangential forces of accelerating vortex flow, and raising axial moment under lifting forces of the flow, reflecting raise of pressure drop along the channel. The raising rotation and axial moments are transmitting from the airfoils to the drum 340. The rotated magnets as 345 develop alternating magnetic whirl inducing three-phase voltage in conductors as 347. Further unloading of rollers as 363–367 is going under lifting forces of vortex flow. Additionally, the airfoils receive growing centripetal forces under wing effects acting due to made profile of the airfoils passed by vortex flow. These forces partially compensate the centrifugal forces acting on rotated drum, thus raising its strength excess.

(7) Control of electric power through control of inducing electromagnets, switching of series and parallel modules as 347 of stator, steam jets, and inlet air vanes of energizer, swirler(s) and re-enhancer(s).

At decrease of electric load, the switching-out of the modules is going in return order.

At insufficient wind, the same starting and supporting processes are used. The difference can be that at the stadiums before power generation the lee-side vanes stay shut, so these stadiums take lager time or larger amount of injected steam dependent on the ambient temperature. All steam nozzles and air vanes become partially of fully open during power loading of electrical generator.

Figure 1B:
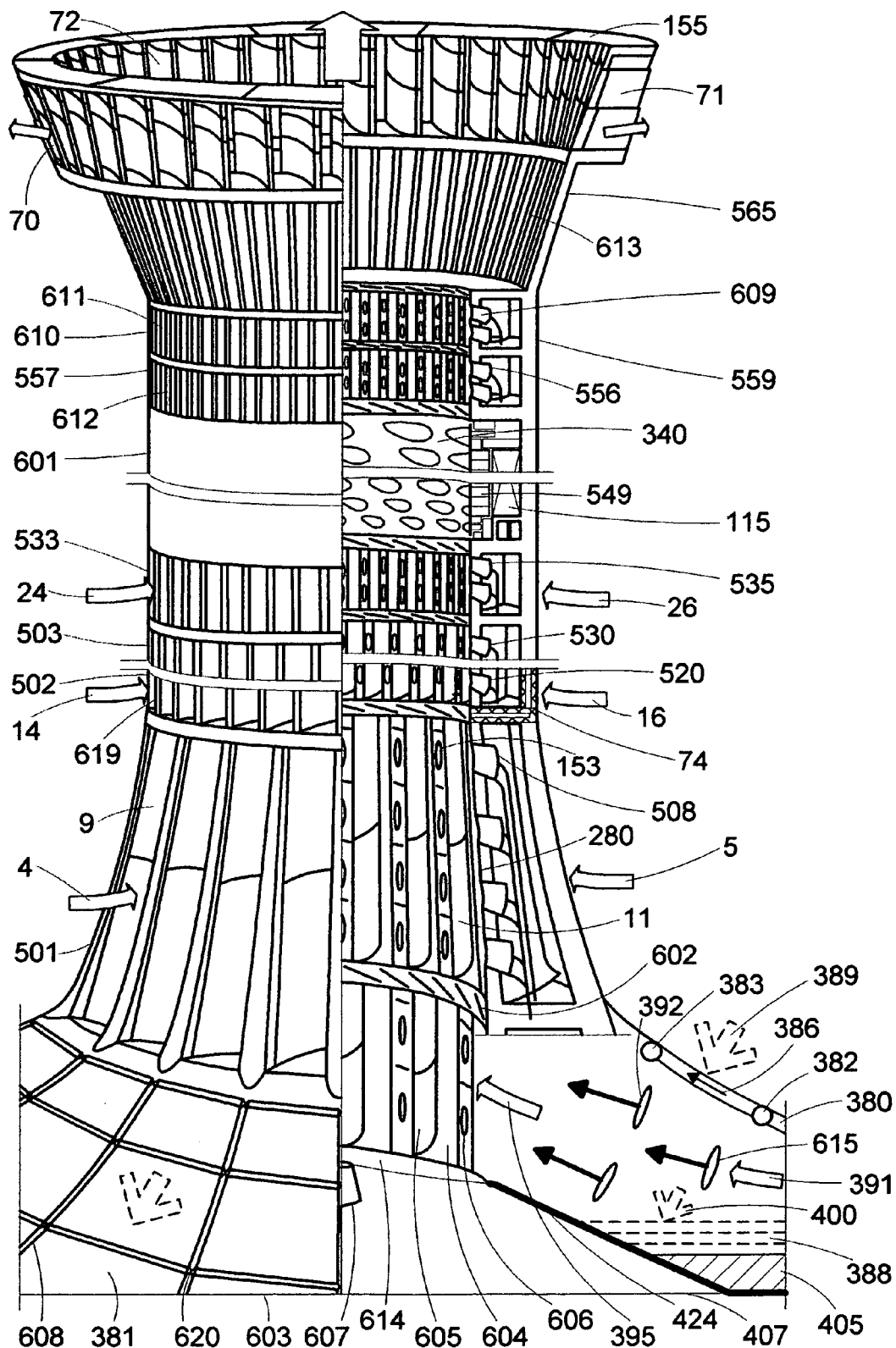
FIG. 1B is the same with off-seasonal heat storage heating and accelerating air by steam jets.
Figure 4:
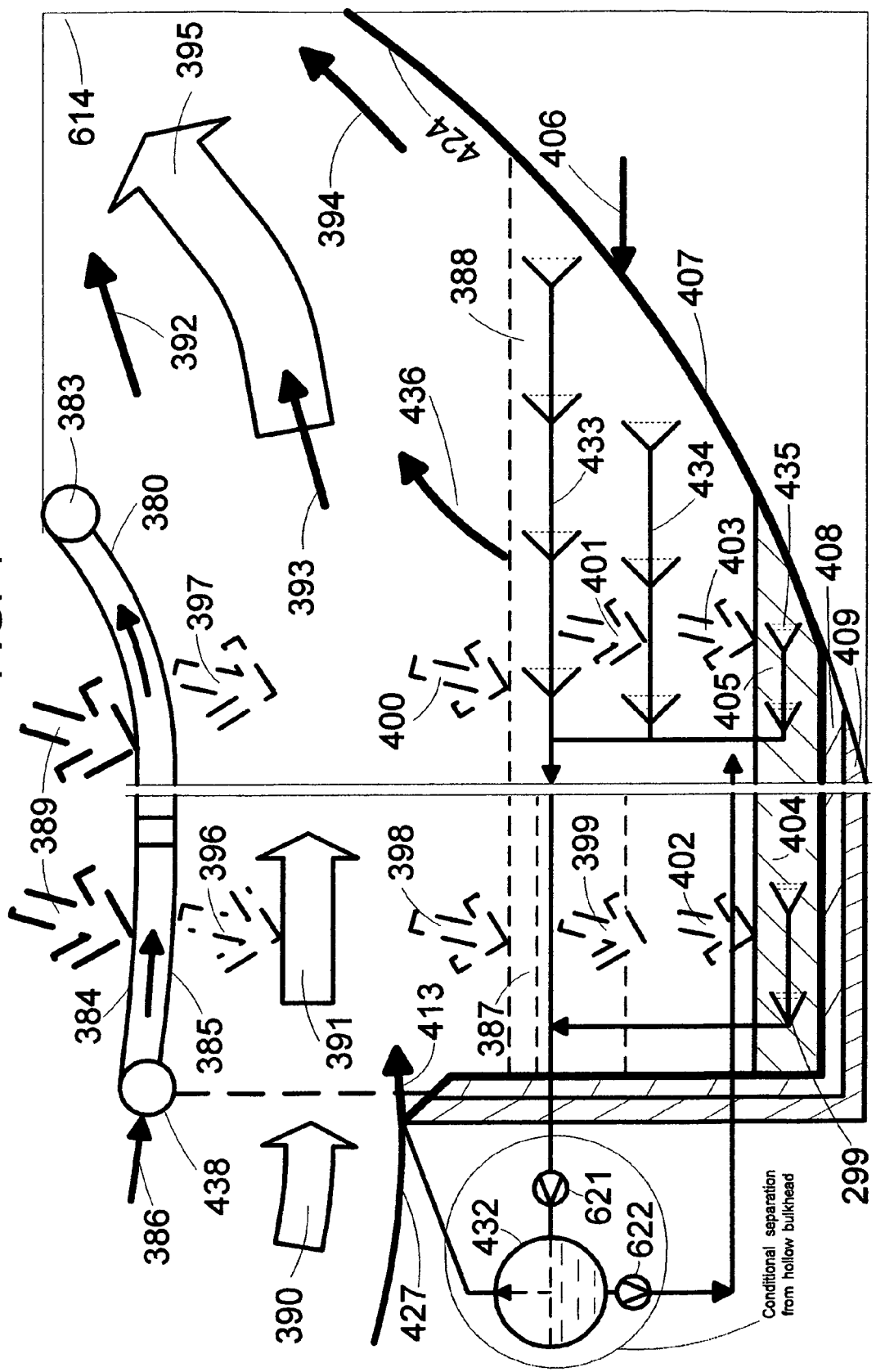
FIG. 4 is a schematic vertical section of off-seasonal heat storage showed at summer sunshine.

At sufficient wind, the steam injecting system operates with minimum steam injection enough for control of air temperature and stability of starting up minimizing deviations. The starting up begins from gradual opening of the wind-side vanes as 611 and 612 at the upper re-enhancers as 610 and 557. Telescoping ribs of vanes as 70–72 together with telescoping fins as 155 at diffuser 565 make longer wind-side vanes and make shorter lee-side vanes, and gradually open them together with vanes as 613 from a wind side (FIG. 1A). Thereby is creating ejection effect of wind relative to lower part of air in the vortex channel. The wind-side vanes also begin to involve wind flows and direct them helically along the vortex channel. If the wind becomes insufficient, all vanes as 70–72 are made maximum long, and shut together with vanes as 613 to increase diffuser effect. The vanes of re-enhancers also become shut, and the steam jets from the nozzles as 556 and 609 fulfill ejecting function. All vanes of lower swirlers become open, and circular rows of steam jets from the nozzles as 535, 530, 520, 508 and 153 suck and force ambient air. The choice of starting-up regime depends on wind velocity. If velocity is not enough for stable starting up in generation regime, the motor regime, and then the generation regime are used as described in points (1)–(7) above. If velocity is enough and wind direction is stable enough, the generator starts-up in generation regime according to points (5)–(7). The downloading and switching-out of generator, steam, and air vanes go in return order with gradual return to loading of rollers as 363–367 supporting the drum. The plant of the second embodiment has the vortex tower and electric generator of the first embodiment, and an off-seasonal storage 603 of heat connected with an additional vortex energizer 614 at the base of tower (FIGS. 1B, 4 and 5). The storage provides stable operation of the plant at unfavorable climatic conditions with cold winter and changeable power loading including low and peak loads. Waste or geothermal heat, if any, can complement directly or via water heaters the main solar and wind sources, the same as for the first plant embodiment above. The heat excess of the storage can amount ~30–150% and higher dependent on climate and regime.

The vortex channel 280 and the storage have streamline interconnection through inlet air openings as 604 with adjustable vanes as 605 at additional vortex energizer 614. These vanes and inlet vanes as 427 have two operation positions. They are fully opened during functioning of the interconnection, and shut during the rest time. Thereby reliability of interconnection is provided under accelerated and heated airflows. At sufficient wind, the vanes as 605 and 427 are fully opened from the wind side.

The storage has multifunctional design with vortex tower 74 in a center. It serves for supply of tower by kinetic energy and heat of fast steam jets as 606 and of accelerated airflows as 395 during cold periods, and at absence of sufficient wind, solar radiation, and hot ambient air. At favorable weather, the storage receives solar energy and wind or stagnant air sucked by vortex flow, accumulates heat, accelerates steam jets, and humidifies, heats, and accelerates airflows into additional vortex energizer 614.

For these aims, the storage 603 has multi-layer structure that comprises (FIGS. 1B, 4 and 5):

transparent roof 380 made of double-glass modules as 381 having anti-reflective glass or plastic sheets and heating water under solar radiation, and having switched water collectors as 381–383 and 438 made of transparent anti-reflective glass or plastic tubes;

ponds 387 with salty water and ponds 388 with pure water located at circular periphery and around tower; heat accumulating/releasing materials 404 and 405 of high heat density at the bottom of the ponds with heating-and-cooling water tubes as 299, 431, 433, 434, and 435 in these materials and in the ponds; hollow bulkheads as 608 supporting transparent roof 380 and forming, together with the roof and surfaces of the ponds, the channels with inlet vanes as 427 for centripetal acceleration of wind or sucked airflows as 390, 391, 395, 410, 418, 419 and 423;

flash-off drums as 432 feeding steam nozzles as 413, having water piping with inlet and outlet control pumps as 621 and 622, located in the hollow bulkheads as 608, and having openings as 615 into the channels for accelerated steam jets as 392–394 and 411–415.

The water tubes have regime of heating of the materials using alternatively one of the solar, geothermal or waste sources, and regime of heating by stored water and materials for heat delivery through these tubes. For normal functioning during cold weather, in the storage 603 are used the next intensified processes: direct solar heating as 389 of water as 386 in the double-glass modules as 381 of transparent roof 380, and through the roof in ponds as 387 and 388, and in materials of high heat density, during sunny periods; usage of heated water for flashing and directed acceleration of jets of saturated steam through staged system of steam nozzles with openings as 615 into air channels of storage, as 606, as 607 at the base, and as 153, 508, 520, 530, 535, 556 and 609 in the vortex channel, during calm and/or cold and dark periods; humidifying, heating, and directed acceleration of captured wind or sucked airflows as 423 in the air channels of storage by steam jets as 411–415 during dark and cold periods;

heat and mass transfer as 436 from water surfaces of ponds to accelerated wind or sucked airflows above. Every module 381 is made of two glass sheets 384 and 385 with flow of water 386 between them. Tube collectors as 382 and 383 connect the modules. Fittings as 620 control distribution of water between the modules dependent on direction and intensity of solar rays and wind.

During sunshine, the modules heat water without boiling. The collectors transport heated water into ponds as 388 for heat accumulation. The solar rays as 389 partially pass through the roof, and heat water in the lower ponds as 387 and 388. The inlet wind as 390 or stagnant air is sucked between roof and pond surfaces through inlet vanes as 427 and additionally accelerated to the center by fast steam jets.

For functioning during the calm or insufficient wind, the sucked in air as 391 is humidified, heated, and accelerated into additional vortex energizer 614 with directing surface 424, via supplementary steam jets as 392, 393, and 394. The steam jets are received after flexible flashing of accumulated hot water in the flash-off drums as 432 and directed acceleration of steam through steam nozzles into centripetal airflow as 395. The flow is formed from the enhanced airflows as 390 and 391, and additionally sucked into vortex tower under pressure drop created by vortex flow. These airflows additionally receive heat from the solar rays as 396 and 397 passed through the transparent roof 380. The weakened solar rays as 398 and 399 heat the layers of ponds as 387. The similar rays as 400 and 401 heat the layers of ponds as 388. At sufficient wind and sunshine, the tower works at minimum controlling steam injection, and pond as 388 receives almost full solar insolation via accumulation of water 386 heated in the roof. Radial bulkheads as 608, working as nozzles, accelerate the wind flows, which cross inside additional vortex swirler 614. The solar rays as 402 and 403 reaching bottom of the ponds are heating the accumulating/releasing materials as 404 and 405. These materials, as washed pebbles or granular materials, have higher density of accumulated heat than pure or salty water. They are covered from the upside by coarse gravel painted by black metallic paint. Usage of such cheap materials gives larger useful depth with higher bottom temperature up to ~90–100° C. in the ponds with pure water and up to ~105÷110° C. in the ponds with salty water, and higher specific heat capacity of the ponds at lower specific cost.

For functioning in the regions with cold winter, and with water deficit, the slightly pressured dissociating/recombining ferric hydrates in a catalyst cover are used. They give higher heat capacity of the ponds with water heating near bottom up to 110–120° C. A re-circulated condensate as 406, slightly pressured and heated in the additional solar heaters of the parent patent up to ~150° C., is directed (Not showed) into the tubes as 299, 431, 433–435 inside the bottom layer with said hydrates in the ponds as 387 and 388. Received heat partially is accumulated by the hydrates, and partially is transmitted into the higher layers of water and into vapor flows as 436. The ponds have waterproof and thermal insulating layers 407 and 408, and foundation structure 409 supporting the roof 380 through the hollow bulkheads as 608.

During cold winter, the accumulated hot water and heat of materials are used in the limits of heat excess. The main heating and accelerating means for inlet cold air with snow as 410 are the rows of saturated steam jets as 411–415 and 392–394 (FIG. 5). The jets provide the following process steps:

inertial removing of snow particles of higher weight as 417 at turning of inlet airflows as 418, 419 via horizontal sucking through adjustable inlet vanes as 427, when the particles continue their vertical move; involving of the rest snow particles as 420, which are close to inlet, into inlet airflows as 410;

replenishment of spent water via melted snow as 428 in peripheral heated airflows as 423 mixed with hot steam jets as 411–413, and falling of received water drops into peripheral ponds as 387;

further humidifying, heating, and acceleration of airflows via rows of faster steam jets as 414 and 415; turning of accelerated airflows as 395 and further acceleration above directing surface 424 into additional vortex energizer 614 (FIGS. 1B and 5) with usage of rows of steam jets as 392–394.

During negative ambient temperatures, the transparent roof 380 serves as isolating double-glass surface above the ponds. Water filling the roof is replaced by locked air or inert gas. Additional thermal insulation of the roof gives snow coverage 421 having low heat transfer to glass. Warmer roof is melting the contacting layer of snow and gathering water into layer 422. This layer is giving a falling water flow as 426 into pools as 387 through openings in the roof with scrubbing of the sucked and heated airflow as 423. Such utilization of snow for water replenishment decreases heat losses through the roof and prevents the roof from overloading by snowfalls. The cleaned roof can transfer solar rays at the winter.

The ponds as 387 and 388 are detached with observance of square proportion between their surfaces dependent on climate, so as peripheral ponds are cooled by melted snow as 426 and 428. The central ponds as 388 are used for direct humidifying and heating of airflows as 395, through surface vaporization as 436. The additional directed acceleration of the flows as 395 by steam jets as 392–394 is made via water heaters as 431 in salty water 429, 430 and in materials 404 with further flashing in flash-off drums as 432. The same is made additionally via hot water delivery from pure water as 433–435.

Starting up of vortex plant with off-seasonal storage during cold period and insufficient or absent wind and solar radiation goes in the same order as for the plant of the first embodiment using motor regime of flow-through electric generator with rotated drum. The specific is that the storage is ready-made to supply hot water to the zones of vortex channel for filling and heating of the flash-off drums and nozzles, further flashing, and acceleration of the steam jets into the zones of vortex channel. Moreover, the storage decreases a time of starting up via using of steam jets for centripetal acceleration of heated and humidified flows of sucked air into additional vortex energizer 614. An increased differences of density and pressure between outside and inside air creates additional circulation of ambient air through the storage and vortex channel. It allows support positive temperatures in the channel during starting up and operation, increase velocities and power of vortex flow, and augment power without icing in the channel. The steam jets have subsonic velocities of 100–250 m/s or higher in the channels of storage and in the vortex channel, and temperature of about +97÷100° C. or higher with slightly higher pressure at starting up via off-seasonal storage having accumulating ferric hydrates. Such jets contact with sucked and slower moving cold air of low negative temperature down to −10÷30° C. Such large difference, including also larger differences of turbulent viscosity of air, saturated steam, and their mixture, is absent at forming and acting of natural tornadoes, or at operation of vortex tower forced by sufficient wind. The artificial heat and mass transfer with release of latent condensation heat and acceleration of centripetal and swirling flows inside the channels of storage and vortex channel is going under correspondingly higher gradients of temperature, pressure, and velocity. Therefore the total process is going many times more intensively and compactly than in the natural tornadoes or wind-driven confined tornadoes. The field of maximum and intermediate velocities created along the radius and axis of vortex core is the zone of peripheral placing of rotated drum of generator with work airfoils. In this zone can be received the several orders of magnitude higher power, than in secondary near-bottom flow sucked by vortex flow, as in the Prior Art. At significant periods of negative ambient temperatures (° C.) with insufficient or absent wind and solar radiation, including long cold winter, the means to start up and stably operate are same that are applied for intensification, compacting and cheapening of vortex power plant. Those are the following means:

(a) The inlet parts of operating air nozzles with opened adjustable vanes of off-seasonal storage and vortex tower receive heat through warm walls of hollow bulkheads of storage and hollow columns of tower containing flash-off drums and steam nozzles at ~100° C., and up to ~100–120° C. during starting up. During the most unfavorable periods at winter, the inlet vanes of tower can be fully shut, the steam nozzles are opened, and all air can be involved under increased velocities through peripheral zone of storage with further heating and acceleration into additional vortex energizer 614 (FIG. 1B). Then inlet air is heated and accelerated by steam jets as 411–413 (FIG. 5). Further icing of this heated air in the tower is excluded without combustion of fuel. The controlled system of fast jets of saturated steam heats and forces air along all vortex energizers, swirler(s) and re-enhencer(s) of tower with acceleration of vortex flow up to the level that provides given power of electric generator.

(b) The internal slots and ties for condensate not contact with cold ambient air. The temperature drop between steam jets of ~100° C. and colder air is higher than at summer. This intensifies heat and mass transfer and release of latent condensation heat of saturated steam in the storage and tower raising vortex power and compensating decrease of air rate at shut inlet vanes of the tower. Such compensation is going also via controlled increase of steam rate through steam nozzles both of the tower and of storage.

(c) The flow-through electric generator with rotated drum has not outside subsystems with condensate. Therefore, the plant is better adaptable to cold winter. The generator can operate under lower velocities of vortex flow because does not need for the limited lower level of vortex centrifugal and lifting forces. The inducing magnets fixed at rotated drum interact synchronously with modules of three-phase stator at any vortex velocities. The generator is cooled better and can raise useful electric power at lower temperature of passing through vortex flow. This raise also compensates decrease of air rate at shut vanes of tower. The off-seasonal storage raises equivalent annual operation time from 3,500–5,000 h/year up to 5,500–6,500 h/year for vortex plants using wind and solar energy in the regions with cold winter, at ~30–150% excess of heat dependent on climate and regime.

At usage of waste heat of large industrial works, thermal plants or atomic plants in regions with cold winter, the equivalent annual operation time can attain of 7,000–8,000 h/year at relatively small regime storage of ~10–20% from rejected waste heat. In this case, the vortex plant yields minimal size, specific investment, and price of energy and water, because of absence of solar field and off-seasonal storage. This is the basis for compacting and effective all-climate functioning of steam-enhanced vortex power plants without firing of fuel including unfavorable, but also productive climatic and regime conditions. The plant of the third embodiment includes, additionally to the first embodiment in the parent patent, the flow-through electric generator with modification of rotated magnetic concentrators (MACs) intended for operation during reduced velocities of vortex flow. A preferred modification of MAC gives lower weight and repulsion than design with circular core and three magnets, and comprises (See FIG. 6):

1) A joined magnet made of the following components:

a high-permeability ellipsoidal core 301 with vertexes 302 and 303 at the largest diameter of ellipse; two symmetrically converging permanent magnets 308, 309 borne by the core and focusing maximum flux density in an external zone crossing through in series the phase conductors of circumferential stator.

2) A profiled circular magnetic enhancer 314 with circular hole 315, enhancing the direct flux density.

3) A spherical shell 316 smooth on the outside, made of fiberglass laminate, fixing the jointed magnet with enhancer, and resting on the ellipsoidal core having diameter of a circumcircle equal to inner diameter of shell. The shell has on the inside two profiled stop lugs 317 and 318 with empty spaces for cooling by inner sub-atmospheric air filling the shell. The lugs form the symmetrical sectors bearing and fixing the core in the shell 316. They create two zones of magnetic resistance for back magnetic fluxes, and reduce repulsion of poles S of neighboring whirled MACs. The empty symmetrical sectors 322, 323 near vertexes 302, 303 are filled by said sub-atmospheric air. The zones including these vertexes with space sectors give main ways with minimum magnetic resistance for back magnetic fluxes to the pole S.

4) An outside shell 327 that is two-side smooth, is made of fiberglass laminate, and is moved by aerodynamic forces of vortex airflow.

5) A partial gap 328 between shell 316 and enhancer 314, slacking stresses between enhancer 314 and shell 327 during interactions of this shell with stator, neighboring MACs, and walls of magnetic system.

6) A free air gap 329 between the nested shells 316 and 327, and ventilation holes as 330, 331 in the shell 327, cooling the shell 316 and the jointed magnet. The holes serve also for maintenance of MAC.

A gravity center of MAC is located out of a geometric center of the shell 316, between the enhancer 314 and magnetic core 301 on an axis of the direct magnetic flux, yielding radial orientation of the magnetic pole N during whirling of MAC by vortex airflow.

A center of the outer flux zone is distanced from the magnetic enhancer 314 and superposed with a center of equivalent cross-section of the nearest passed through phase conductor of stator.

Figure 7:
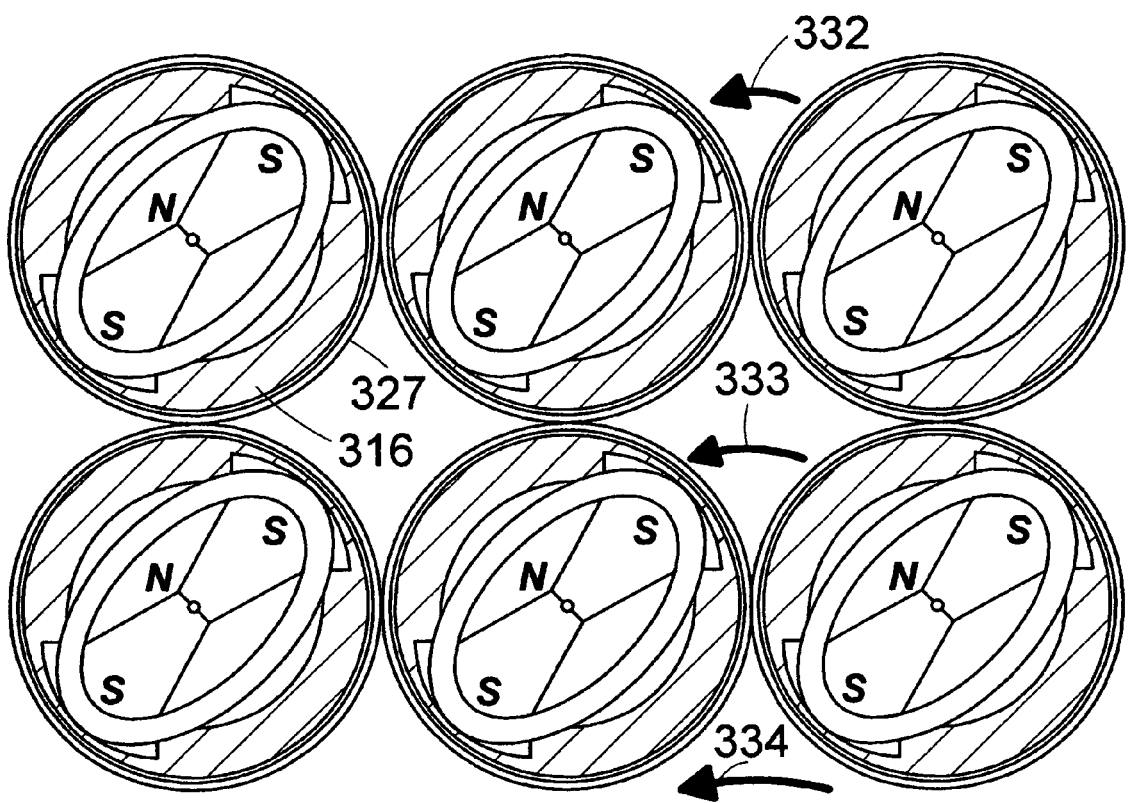
FIG. 7 shows the additional orientation of whirled MACs with ellipsoidal core under repulsion of poles S at low velocities of vortex airflow. The MACs are showed from the backside relative to FIG. 6B.

During reduced vortex velocities and momentum, the repulsion forces of the poles S turn the neighboring whirling MACs into mutual positions giving dynamical equilibrium of the acting forces. These positions give larger distances between the poles S. The zones 317 and 318 giving maximum magnetic resistance are located between the neighboring MACs. They reduce additionally the repulsion of the poles S. Corresponding mutual location of whirled MACs is showed in FIG. 7. The helical forces of vortex airflow 332–334, decreased upwardly, carry and turn the outer shells as 316, but not turn the slipping inner shells as 327, and thus not influence onto orientation of the magnetic poles. It is seen that the ellipsoidal core with two magnets gives maximum distancing and lower repulsion of the poles S relative to circular core with three magnets in the parent patent. Together with lower weight, the ellipsoidal core gives stable work of MACs at lower velocities and momentum of the vortex airflow. The intensity of total magnetic whirl also is lower, together with lower power load.

The main effect is continuation of synchronous whirling of modified MACs in the outlet vortex airflow having several times lower velocities than inlet velocities of vortex airflow before electric generator. The permanent magnets 308 and 309 are made of laminated hard-magnetic plastic for operation at low velocities. The core 301 is made of reinforced high-permeability plastic.

The rated quantity of rotated MACs depends on controlled rated quantity of circular rows, even rated quantity of rotated MACs in every row, outside diameter of MAC, and inlet velocity of MACs, which are correlated with inner diameter of vortex channel. The even rated quantity of rotated MACs in every row is a common devisor to inner diameter of channel and 3,000/3,600 rotations per minute at standard frequency of current of 50/60 Hz.

For instance, at rated power of electric generators of 50–1,000 MW and 50 Hz, the characteristic rated quantity of rotated MACs is of ~5–100 thousands, and rated quantity of rotated MACs in one row is of 200–750. Operation quantity of circular rows of MACs is of 25–133, or lower dependently on electric load and flow performance. Additional quantity of MACs is contained into outside control and maintenance subsystem, and into injector and collector of MACs in vortex tower. The subsystem is parallel to subsystem for MACs having circular core and three magnets, used during electric loads close to rated power and peak loads.

From comparison with MACs having circular core and three magnets in the parent patent, it is seen that increase of number of vertexes and magnets leads to higher weight and repulsion between one-named poles. Therefore, the ellipsoidal core with two magnets is preferable at decreased velocities of vortex airflow.

The first type of MACs for high loads and ambient temperatures can be chosen preferably from the set disclosed in the parent patent. The second type for intermediate and low loads and ambient temperatures can be chosen preferably with ellipsoidal core and two permanent magnets disclosed above.

What is claimed is:

1. An all-weather vortex plant of large electric power intensified, compacted, and cheapened via high-power kinetic energy and latent condensation heat of staged system of fast jets of saturated steam located along height of vortex tower before and after a flow-through electric generator with rotated drum; steam nozzles fed by controlled flash-off drums using slightly pressured, heated, and stored water supply the system; the plant has alternatively one or two from solar, geothermal, or waste and secondary sources for heating of water to supplement, replace and exceed energy of used wind without combustion of fuel, extensive convection collector, mechanical sucking of ambient air, overstressed moving components of vortex tower, or large number of air turbines of limited power; the plant can fast start up and operate a long time, partly, during insufficient or absent wind and source of heat at changeable and low ambient temperatures and electric loads giving changeable and reduced velocities of vortex airflow, and preferably comprises:

a steam-enhanced vortex tower having a vertical vortex channel with located along said channel a near-bottom vortex energizer, at least one swirler above, a flow-though electric generator with rotated drum and flexible three-phase stator having switched modules, at least one re-enhancer above said generator, and a top diffuser;

a staged system of rows of alternate steam and air nozzles, which form said energizer, swirler(s) and re-enhancer(s) and have stretched outlets of accelerated steam jets and accelerated flows of captured wind or sucked ambient air directed into said vortex channel;

a system of slots in inner walls of said vortex channel for centrifugal capturing of condensate drops precipitating inside vortex flow from vapor of whirling saturated air, and from said saturated steam mixing with colder air along height of said channel;

an outside system supplying heated and stored water to zones surrounding said vortex channel;

said air nozzles are formed by hollow neighboring streamline columns surrounding, supporting and strengthening said vortex channel;

said columns are hollow and contain said flash-off drums with fed steam nozzles having stretched outlets into said vortex channel between stretched outlets said air nozzles, and have slots for capturing of condensate;

said columns are strengthened by hollow rings having slots for capturing of condensate;

said flash-off drums have piping of hot water with control pumps and 1 fitting, and piping with control pumps and fitting for condensate removed after said flash-off drums and slots;

said steam nozzles receive saturated steam from said flash-off drums and accelerate said steam jets quasi-tangentially-and-upward into said vortex channel;

said steam jets suck, force, and accelerate said captured wind or flows of sucked stagnant air through said air nozzles into said vortex channel under pressure drop created in vortex flow and supported by said steam jets, under kinetic energy of accelerated steam, and via latent condensation heat of saturated steam partially condensing and conversing into directed kinetic energy inside said vortex channel;

said air nozzles have adjustable inlet vanes controlling acceleration said captured wind, or suction and acceleration of said free air, quasi-tangentially-and-upward into said vortex channel;

said outside system has heaters that heat slightly pressured water up to ~100° C. or higher without boiling, and can have regime storage of heat with excess depending on climatic and regime conditions;

said heaters have alternatively one or two from solar, either geothermal, or waste and secondary sources of heat available in local conditions;

said heaters are intensified and compacted via sucking of heated water by vortex flow through outlet water piping, giving increased water velocities and heat transfer, and allowing use cheap construction materials and fabrication and maintenance technologies;

said heaters using solar radiation include first stage with long water-cooled cylinder parabolic reflectors and second stage with water-cooled collectors of large diameter at several discrete steps of daily one-axis orientation on sun;

said waste source of heat can be complemented by another waste or secondary source of heat available at the same factory or power plant, thus providing long operation at negative ambient temperatures (° C.), and can supported by regime storage for power augmenting alternatively by complementing solar or geothermal heating, providing excess dependently on regime of waste heat rejection and power loading;

said waste heat rejected with water can be utilized directly or after purifying of water, and waste heat rejected with other medium can be utilized through water heating tubes in said regime storage;

said collected condensate is used partially as a cooler of said stator of electric generator, and is directed after said slots, said flash-off drums and said stator into said heaters or said storage for water replenishment;

said collected condensate can have excess used for delivery of condensate to external consumers;

said storage of heated water can be made as solar pond that is open, or is shut by transparent roof, and has series sections of colder water, warmer water, and hot water gathered from surface of said sections and receiving complementing heat of said waste or geothermal sources, if any;

said flow-through electric generator with rotated drum comprises:

at least one rotated drum of standard angular velocity driven by said vortex airflow and having two work sides:
  on the inside are located stages of work airfoils conversing kinetic energy of vortex airflow, augmented by pressure and thermal heads in said vortex airflow passing through said generator, into kinetic energy of rotation of said drum;
  on the outside are located:
    magnets inducing three-phase voltage in switched modules of conductors of said three-phase stator;
    magnets of magnetic cushions and suspensions bearing said rotated drum;
    said kinetic energy of vortex airflow is augmented by pressure head and thermal head in said vortex airflow passing through said generator, and also by sucking from located above re-enhancer and top diffuser;

said rotated drum has a steal frame comprising carried in a circle vertical stiffening beams strengthened by inner and outer horizontal rings;

said inner rings bear and fix said stages of work airfoils and a wall detaching said vortex airflow;

said beams and outer rings bear and fix said inducing magnets and groups of magnets of said cushions and suspensions having also interacting magnetic units at a case of said generator;

said work airfoils are hollow and can be at least of the next kinds:
  laying on lower inside rings and facing the highest peripheral velocities of said vortex flow;
  half-laying on higher inside rings, or on inside rings of a second drum located above if any;
  said laying airfoils have longitudinal waveform with half-spherical cross sections, and have height smaller of half of footing width;
  said half-laying airfoils have longitudinal waveform with half-ellipsoidal cross sections, and have height close or larger of footing width, but lower of two footing widths;

said airfoils have length several times larger of height, giving continuity of air passing;

said airfoils are strengthened by inner fins, have fixing roots in said inner rings along foot perimeter, and are made of low-temperature blade steels, or of strengthened plastics;

said airfoils can have outer longitudinal ribs reducing aerodynamic losses and increasing lifting forces transmitted by said vortex airflow;

said rotated drum is borne by said magnetic cushions and suspensions, complementing said lifting forces of said vortex airflow, and has stabilizing radial magnetic cushions near bottom and top of said drum;

said second rotated drum, if any, has lower standard angular velocity and can use lower velocities of said vortex airflow under changeable weather and loading conditions;

said magnetic cushions and suspensions are integrated with aligning rollers made of reinforced rubber, normally unloaded, working at starting up and switching out of said generator;

said inducing and said bearing magnets combine symmetrically permanent magnets and electromagnets for flexible control and simplifying of design of said generator;

said permanent magnets of said rotated drum are maid of laminated magnetic plastics;

said electromagnets of said rotated drum have core made of reinforced high-permeability plastics;

said conductors of three-phase stator are banked into modules switched in series and in parallel via outside switching subsystem for flexible control of performance of said generator during starting up and operation regimes;

said modules are cooled in parallel by said condensate;

said generator is cooled by air bypassing said vortex airflow under its pressure drop;

said rotated drum and said three-phase stator are precisely symmetrical relative to vertical axis of said generator.

2. An all-climate vortex plant of large electric power intensified, compacted, and cheapened via high-power kinetic energy and latent condensation heat of staged system of fast jets of saturated steam located along air channels of an off-seasonal heat storage and along height of a vortex tower before and after a flow-through electric generator with rotated drum; steam nozzles supply the system and are fed by controlled flash-off drums using slightly pressured, heated, and stored water; the storage is enhanced by solar radiation and by said jets, and fulfills functions of intensified solar heater of water humidifier, heater, and accelerator of wind or sucked stagnant air into said tower, and of supplier of said tower by heated water feeding said system of steam jets; thereby the storage provides high-power kinetic energy and heat both of saturated steam and air yielding fast starting up and long operation of said plant at unfavorable climate and regime, partly, at cold winter and changeable power loading with low and peak loads during the calm and absence of solar radiation, the plant can have alternatively additional solar, either waste, or geothermal heaters of water due to local conditions, said kinetic energy and heat partially conversing into vortex kinetic energy supplement, replace, and exceed energy of used wind without combustion of fuel, extensive convection collector, mechanical sucking of ambient air, overstressed moving components in vortex tower, and large number of air turbines of limited power, the plant preferably comprises:

a steam-enhanced vortex tower having a vertical vortex channel with additional and main energizers of vortex flow, at least one swirler above, a flow-though electric generator with rotated drum and flexible three-phase stator, at least one re-enhancer above said generator, and a top diffuser;

a staged system of rows of alternate steam and air nozzles, which form said energizers, swirler(s) and re-enhancer(s) and have stretched outputs of accelerated steam jets and accelerated flows of captured wind or sucked stagnant air into said vortex channel;

a system of slots in inner walls of said vortex channel for centrifugal capturing of condensate precipitating inside vortex flow from vapor of whirling saturated air, and from said saturated steam mixing with colder air along height of said channel;

an off-seasonal heat storage simultaneously fulfilling functions of solar heating of water and air, flashing of water, acceleration of steam jets into air channels of said storage, sucking and acceleration of wind or stagnant ambient air by said steam jets along said air channels into said additional vortex energizer of said tower, and supplying of hot water to zones along said vortex channel;

an outside system supplying hot water into said storage and into said zones;

said air nozzles are formed by neighboring streamline columns surrounding, supporting and strengthening said vortex channel;

said columns are hollow and contain said flash-off drums with fed steam nozzles having stretched outlets into said vortex channel between outlets of said air nozzles, and have said slots for capturing of said condensate;

said columns are strengthened by hollow rings having said slots for capturing of said condensate;

said flash-off drums have hot water piping with control pumps and fitting, and piping with control pumps and fitting for condensate removed after said flash-off drums and said slots;

said steam nozzles receive saturated steam from said flash-off drums and accelerate steam jets quasi-tangentially-and-upward into said vortex channel;

said steam jets located along said vortex channel have outlet pressure controlled between ambient pressure and lower pressure inside vortex airflow;

said steam jets located along said vortex channel suck, force, and accelerate said captured wind or stagnant ambient air through said air nozzles into said vortex channel under pressure drop created in vortex flow and supported by said steam jets, under kinetic energy of accelerated steam, and via latent condensation heat of saturated steam partially conversing into vortex kinetic energy inside said vortex channel;

said air nozzles have adjustable inlet vanes controlling involving and acceleration of wind, or suction and acceleration of said stagnant air, quasi-tangentially-and-upward into said vortex channel;

said outside system supplying hot water has heaters that heat slightly pressured water without boiling up to ~100° C. or higher during starts, and includes said off-seasonal storage of heat;

said heaters have alternatively one or two from solar, either geothermal, or waste and secondary source(s) of heat available in local conditions;

said heaters are intensified and compacted via sucking of heated water by vortex flow through outlet water piping, giving increased water velocities and heat transfer, and allowing use cheap construction materials and fabrication and maintenance technologies;

said heaters using solar radiation include first stage with long water-cooled cylinder parabolic reflectors and second stage with water-cooled collectors of large diameter at several discrete steps of daily one-axis orientation onto the sun;

said waste source of heat can be complemented by another waste or secondary source available at the same factory or power plant, thus providing long operation due to local climate and regime, and can be supported by regime storage for power augmenting, alternatively by complementing solar or geothermal heating, providing excess dependently on regimes of waste heat rejection and power loading;

said waste heat rejected with water can be utilized directly or after purifying of water, and waste heat rejected with other medium can be utilized through water heating tubes in said regime storage;

said collected condensate is used partially as a cooler of said stator of said electric generator, and is directed after said slots, flash-off drums and stator into said heaters or said storage for water replenishment;

said collected condensate can have excess used for delivery to external consumers;

said off-seasonal heat storage has excess provided by solar radiation dependent on said unfavorable climatic and regime conditions, including cold winter;

said off-seasonal heat storage simultaneously is made as solar heater of water and accumulating materials, as accelerator of steam jets directed into said air channels of said storage and into said additional vortex energizer of said vortex tower, and as humidifier, heater, and accelerator of captured wind or sucked stagnant air directed quasi-tangentially-and-upward into said additional vortex energizer, and as supplier of hot water to said zones;

said off-seasonal heat storage surrounds said additional vortex energizer at the base of said vortex tower, is connected with this energizer through humidified, heated and accelerated airflows, is connected with said zones of said vortex channel through ties of hot water and back condensate, and comprises:

a transparent solar roof made of double-glass modules made of anti-reflective glass or plastic sheets, heating water flows between said sheets without boiling, and having meridional collectors switched by fitting and made of transparent anti-reflective glass or plastic tubes;

ponds with pure water located around said tower and closed by said roof, and ponds with salty water located at periphery of said ponds with pure water and also closed by said roof;

heat accumulating/releasing materials of high heat density at a bottom of said ponds with inside water tubes having regime of heat intake alternatively supported by one of the solar, either geothermal, or waste and secondary heat source(s), and regime of heat delivery from said materials and stored water during periods of insufficiency or absence of said heat source(s);

hollow radial bulkheads supporting said meridional collectors and forming, together with said roof and water surfaces of said ponds, the centripetally converging channels with adjustable inlet and outlet vanes for involving, humidifying, heating, and acceleration of wind or sucked airflows quasi-tangentially-and-upward into said additional vortex energizer of said tower;

controlled flash-off drums with fed steam nozzles located in said bulkheads and having stretched openings into said channels for accelerated steam jets used for supplemental humidifying, heating, and acceleration of wind or sucked stagnant air along said channels and further quasi-tangentially-and-upward into said additional vortex energizer;

said meridional collectors have control fitting used for distribution of heated water between said double-glass modules dependent on direction and intensity of solar rays and wind;

said heat accumulating/releasing materials can be local granular materials with black metallic paint upside for regions having periods of intermediate and low ambient temperatures, or slightly pressured and relatively cheap dissociating/recombining ferric hydrates in a catalyst cover for regions with long cold winter and deficit of water;

said inside water tubes heat said materials by solar-heated water for heat accumulation at summer and near periods, or heat water by releasing heat of said materials, with further water flashing in said flash-off drums and steam acceleration in said steam nozzles at winter and near periods;

said inlet and outlet vanes of said air channels are fully opened at delivery of air into said additional vortex energizer, and are fully shut the rest time, dependently on weather and power loading;

said flow-through electric generator with rotated drum comprises:

at least one rotated drum of standard angular velocity driven by said vortex airflow and having two work sides:

on the inside are located stages of work airfoils conversing kinetic energy of vortex airflow, augmented by pressure and thermal head in said vortex airflow passing through said generator, into kinetic energy of rotation of said drum;

on the outside are located:

magnets inducing three-phase voltage in switched modules of conductors of said three-phase stator;

magnets of magnetic cushions and suspensions bearing said rotated drum;

said kinetic energy of vortex airflow is augmented by pressure head and thermal head in said vortex airflow passing through said generator, and also by sucking from located above re-enhancer and top diffuser;

said rotated drum has a steal frame comprising carried in a circle vertical stiffening beams strengthened by inner and outer horizontal rings;

said inner rings bear and fix said stages of work airfoils and a wall detaching said vortex airflow;

said beams and outer rings bear and fix said inducing magnets and groups of magnets of said cushions and suspensions having also interacting magnetic units at a case of said generator;

said work airfoils are hollow and can be at least of the next kinds:

laying on lower inside rings and facing the highest peripheral velocities of said vortex flow;

half-laying on higher inside rings, or on inside rings of a second drum located above if any;

said laying airfoils have longitudinal waveform with half-spherical cross sections, and have height smaller of half of footing width;

said half-laying airfoils have longitudinal waveform with half-ellipsoidal cross sections, and have height close or larger of footing width, but lower of two footing widths;

said work airfoils have length several times larger of height, giving continuity of air passing;

said work airfoils are strengthened by inner fins, have fixing roots in said inner rings along foot perimeter, and are made of low-temperature blade steels, or of strengthened plastics;

said work airfoils can have outer longitudinal ribs reducing aerodynamic losses and increasing lifting forces transmitted by said vortex airflow;

said rotated drum is borne by said magnetic cushions and suspensions, complementing said lifting forces of said vortex airflow, and has stabilizing radial magnetic cushions near bottom and top of said drum;

said second rotated drum, if any, has lower standard angular velocity and can use lower velocities of said vortex airflow under changeable weather and loading conditions;

said magnetic cushions and suspensions are integrated with aligning rollers maid of reinforced rubber, normally unloaded, and working at starting up and switching out of said generator;

said inducing and said bearing magnets combine symmetrically permanent magnets and electromagnets for flexible control and simplifying of design of said generator;

said permanent magnets of said rotated drum are maid of laminated magnetic plastics;

said electromagnets of said rotated drum have core made of reinforced high-permeability plastics;

said conductors of three-phase stator are banked into modules switched in series and in parallel via outside switching subsystem for flexible control of performance of said generator during starting-up and operation regimes;

said modules are cooled in parallel by said condensate;

said generator is cooled by air bypassing said vortex flow under its pressure drop;

said rotated drum and said three-phase stator are precisely symmetrical relative to vertical axis of said generator.

3. An all-weather vortex plant of large electric power intensified, compacted, and cheapened via high-power kinetic energy and latent condensation heat of system of fast jets of saturated steam located along height of vortex tower before and after a flow-through electric generator with magnetic concentrators; steam nozzles fed by controlled flash-off drums using slightly pressured, heated, and stored water supply the system; the plant has alternatively one or two from solar, either geothermal, or waste and secondary sources for heating of water to supplement, replace and exceed power of used wind without combustion of fuel, extensive convection collector, mechanical sucking of ambient air, overstressed moving components of vortex tower, or large number of air turbines of limited power; the plant can fast start up and operate a long time, partly, during insufficient or absent wind and solar radiation at mainly positive ambient temperatures (° C.), and intermediate power loads causing intermediate velocities of vortex airflow, and preferably comprises:

a steam-enhanced vortex tower having a vertical vortex channel with a near-bottom energizer of vortex flow, at least one swirler above, a power generating structure including an injector of magnetic concentrators (MACs), a flow-though electric generator with rotated MACs and separator of MACs above, at least one re-enhancer above said structure, and a top diffuser;

a staged system of rows of alternate steam and air nozzles forming said energizer, swirler(s) and re-enhancer(s) and having stretched quasi-tangential-and-upward outlets of accelerated steam jets and accelerated captured wind or sucked stagnant air into said vortex channel;

a system of slots in inside walls of said vortex channel for centrifugal capturing of condensate precipitating from vapor of saturated vortex airflow and from said saturated steam mixing with colder airflow along height of said vortex channel;

an outside system supplying slightly pressured and heated water to zones of said vortex channel;

said air nozzles are formed by neighboring streamline columns surrounding, supporting and strengthening said vortex channel together with said energizer of vortex flow, swirler(s), power generating structure, re-enhancer(s) and top diffuser;

said columns are hollow and contain controlled flash-off drums with fed steam nozzles and control auxiliaries;

said columns are strengthened by hollow rings having slots for capturing of condensate;

said air nozzles have adjustable inlet vanes and accelerate said captured wind or sucked stagnant air quasi-tangentially-and-upward into said vortex channel;

said steam nozzles receive saturated steam from said controlled flash-off drums and accelerate steam jets quasi-tangentially-and-upward into said vortex channel;

said outside system has heaters that heat slightly presured water up to ~100° C. or higher without boiling, and can have regime heat storage with excess depending on climate and regime;

said heaters have alternatively one or two from solar, either geothermal, or waste and secondary source(s) of heat available in local conditions;

said heaters are intensified and compacted via sucking of heated water by vortex flow through outlet water piping, giving increased water velocities and heat transfer and allowing use cheap construction materials, and fabrication and maintenance technologies;

said heaters using solar radiation include first stage with long water-cooled cylinder parabolic reflectors and second stage with water-cooled collectors of large-diameter at several discrete steps of daily one-axis orientation on sun;

said waste source of heat can be complemented by another waste or secondary source of heat available at the same factory or power plant, thus providing long operation due to local climate and regime;

said waste heat rejected with water can be used directly or after purifying of water, and waste heat rejected with other medium can be utilized through water heating tubes;

said collected condensate is used partially as a cooler of said stator of said electric generator and as transporting means for system of control and maintenance of said MACs, and is directed after said slots, flash-off drums, system, and stator into said heaters or said storage for water replenishment;

said collected condensate can have excess used for delivery to external consumers;

said regime storage of heated water is made dependently on said climatic conditions as open or shut solar pond with series sections of inlet colder water, warmer water, and outlet hot water gathered from surface of said sections, and can be complemented by waste or geothermal heat;

said flow-through electric generator with rotated magnetic concentrators comprises:
 a flexible three-phase stator having steel case born by said columns and strengthened by steel rings;
 said MACs rotated by vortex flow at periphery of said vortex channel superposed with said stator;
 said three-phase stator with conductors banked into modules switched in series and in parallel via outside switching subsystem for flexible control of performance of said generator;

said modules of said stator are cooled in parallel by said condensate;

said stator is additionally cooled by air bypassing said vortex flow under its pressure drop;

said stator and said rotated MACs are precisely symmetrical relative to vertical axis of said generator, therefore a controlled quantity of rotated MACs in every row is even;

said MACs are made of a heavier type with circular high-permeability core and three permanent magnets for long lasting rated and near ambient temperatures and power loads, including peak loads, and of a lighter type with ellipsoidal high-permeability core and two permanent magnets for said changeable and intermediate ambient temperatures and power loads;

said MAC of lighter type comprises:
an ellipsoidal high-permeability core bearing and fixing two identical and constricting permanent magnets converging symmetrically out of geometric center of said core and focusing maximum magnetic flux density in an external zone;
a profiled circular magnetic enhancer with a through circular hole, made of soft electrical laminated steel and raising said flux density, said enhancer fixes converging ends with poles N of said magnets having diverging wider ends with poles S joined symmetrically by said core;
two spherical shells nested with air gap, made of fiberglass laminate, and having the next designs:
 an outer protective shell that is two-side smooth and has ventilation and stabilizing holes;
 an inner shell smooth outside, attaching said core, magnets and enhancer, and resting on said core;
said inner shell has two profiled stop lugs forming symmetrical sectors bearing and fixing said core in said shell and creating two zones of additional magnetic resistance for back magnetic fluxes after interactions with phase conductors of three-phase stator of said generator;
said inner shell has an inside space filled by sub-atmospheric air favorable for magnetic flux, including two symmetrical space sectors near core vertexes giving main ways with minimum magnetic resistance for said back magnetic fluxes;
said inner shell has a partial air gap relative to said enhancer, slackening stresses from said outer shell;
said MAC has a gravity center located out of geometric center of said inner shell, between said magnetic core and enhancer on an axis of said magnetic flux, giving radial orientation of said pole N in said vortex airflow via centrifugal force of whirled MAC;
said magnetic flux forms a zone distanced from said inner shell and superposed with cross-section of the crossed through phase conductor of three-phase stator at whirling of said MAC, said zone has effective width and depth equal nearly to effective width and depth of said conductor;
said outer shell has diameter equal to width of three slots and three teeth of magnetic core of said stator;
said permanent magnets are made of laminated hard-magnetic plastic, and said high-permeability core is made of reinforced plastic;
rated quantity of said rotated MACs depends on controlled rated quantity of circular rows, even rated quantity of rotated MACs in every row, outside diameter of MAC, and rated inlet velocity of MACs, which are correlated with inner diameter of said vortex channel so that said even rated quantity of rotated MACs in every said row is a common devisor to said inner diameter and to 3,000/3,600 rotations per minute at standard current frequency of 50/60 Hz.

* * * * *